United States Patent
Kim et al.

(10) Patent No.: US 10,210,196 B2
(45) Date of Patent: Feb. 19, 2019

(54) DATA STORAGE DEVICE HAVING INTERNAL HARDWARE FILTER, DATA STORAGE METHOD AND DATA STORAGE SYSTEM

(71) Applicant: SAMSUNG ELECTRONICS CO., LTD., Suwon-si, Gyeonggi-Do (KR)

(72) Inventors: Kwang Hoon Kim, Seoul (KR); Man Keun Seo, Hwaseong-si (KR); Sang Kyoo Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 913 days.

(21) Appl. No.: 14/533,672

(22) Filed: Nov. 5, 2014

(65) Prior Publication Data
US 2015/0149490 A1 May 28, 2015

(30) Foreign Application Priority Data
Nov. 28, 2013 (KR) .................. 10-2013-0146351

(51) Int. Cl.
G06F 17/30 (2006.01)
G06F 7/24 (2006.01)
G06F 3/06 (2006.01)

(52) U.S. Cl.
CPC .......... *G06F 17/30342* (2013.01); *G06F 7/24* (2013.01); *G06F 3/0611* (2013.01); *G06F 3/0679* (2013.01); *G06F 17/30569* (2013.01)

(58) Field of Classification Search
CPC ............. G06F 17/30569; G06F 3/0679; G06F 17/30342; G06F 2206/1014; G06F 3/0611
See application file for complete search history.

(56) References Cited

U.S. PATENT DOCUMENTS

| 5,321,843 A * | 6/1994 | Shoji | G06F 17/30985 365/240 |
|---|---|---|---|
| 6,292,844 B1 | 9/2001 | Smyers et al. | |
| 7,970,919 B1 * | 6/2011 | Duran | G06F 3/0616 709/200 |
| 8,225,050 B2 | 7/2012 | Chang et al. | |

(Continued)

FOREIGN PATENT DOCUMENTS

| CN | CN 102682052 A | 9/2012 |
|---|---|---|
| CN | 102929799 A | 2/2013 |

(Continued)

OTHER PUBLICATIONS

Do et al., "Query Processing Smart SSDs: Opportunities and Challenges", Jun. 27, 2013, ACM.*

(Continued)

*Primary Examiner* — Apu M Mofiz
*Assistant Examiner* — Sheryl L Holland
(74) *Attorney, Agent, or Firm* — Volentine, Whitt & Francos, PLLC

(57) ABSTRACT

An all-in-one data storage device includes a secondary memory providing read data in response to a read command, an internal hardware filter that filters the first read data according to filtering condition data in order to output filtered data, a primary memory, a host controller, and a memory controller that stores the filtered data in the primary memory and thereafter communicates the filtered data to the host controller.

17 Claims, 18 Drawing Sheets

(56) References Cited

U.S. PATENT DOCUMENTS

| | | | |
|---|---|---|---|
| 8,244,718 B2 | 8/2012 | Chamdani et al. | |
| 8,359,411 B2 | 1/2013 | Millet et al. | |
| 8,374,986 B2 | 2/2013 | Indeck et al. | |
| 9,201,825 B1* | 12/2015 | Zhou | G06F 13/385 |
| 2004/0062106 A1 | 4/2004 | Ramesh et al. | |
| 2005/0091587 A1* | 4/2005 | Ramarao | G06F 17/2247 |
| | | | 715/248 |
| 2008/0065590 A1* | 3/2008 | Castro | G06F 17/30463 |
| 2011/0066808 A1* | 3/2011 | Flynn | G06F 12/0246 |
| | | | 711/118 |
| 2011/0283035 A1* | 11/2011 | Sutardja | G06F 3/0626 |
| | | | 710/305 |
| 2012/0042376 A1 | 2/2012 | Dolgunov et al. | |
| 2012/0072656 A1* | 3/2012 | Archak | G06F 17/30132 |
| | | | 711/104 |
| 2012/0079175 A1* | 3/2012 | Flynn | G11C 7/1012 |
| | | | 711/103 |
| 2012/0166447 A1 | 6/2012 | Nice et al. | |
| 2013/0060993 A1* | 3/2013 | Park | G11C 7/1006 |
| | | | 711/103 |
| 2013/0297894 A1* | 11/2013 | Cohen | G06F 3/0679 |
| | | | 711/154 |
| 2014/0136761 A1* | 5/2014 | Li | G06F 12/0246 |
| | | | 711/103 |
| 2014/0215129 A1* | 7/2014 | Kuzmin | G06F 12/0246 |
| | | | 711/103 |
| 2014/0281151 A1* | 9/2014 | Yu | G06F 1/30 |
| | | | 711/103 |
| 2015/0032937 A1* | 1/2015 | Salessi | G06F 13/122 |
| | | | 711/103 |
| 2015/0046678 A1* | 2/2015 | Moloney | G09G 5/397 |
| | | | 712/29 |
| 2015/0234610 A1* | 8/2015 | Seo | G06F 3/0619 |
| | | | 711/103 |
| 2016/0350381 A1* | 12/2016 | Cao | G06F 17/30516 |

FOREIGN PATENT DOCUMENTS

| | | |
|---|---|---|
| CN | 103069384 A | 4/2013 |
| JP | S55108030 A | 8/1980 |
| JP | S60105060 A | 6/1985 |
| JP | H04024821 A | 1/1992 |
| JP | 2004110586 A | 4/2004 |
| KR | 10-0457694 | 11/2004 |
| KR | 10-0854032 A | 8/2008 |

OTHER PUBLICATIONS

Menon et al., "CaSSanDra: An SSD Boosted Key-Value Store", Apr. 4, 2014, IEEE.*

White, Collin "Using Big Data for Smarter Decision Making," BI Research, Jul. 2011, pp. 1-10.

Kim, Sungchan et al., Fast, Energy Efficient Scan inside Flash Memory SSDs.

"Getting Started with Big Data," Feb. 2013, Intel IT Center, pp. 1-24.

Cho, Sangyeun et al., "Active Disk Meets Flash: A Case for Intelligent SSDs," Nov. 2011, Parallel Data Laboratory, Carnegie Mellon University, pp. 1-18.

Bodkin, Ron, "Big Data and Data Science Grows Up," pp. 1-55.

Kang, Yunji et al., "Block Separation Technique for Offline Deduplication on Solid State Drives," 2012 vol. 39, No. 1 (A), pp. 379-381.

Chinese Office Action dated Oct. 23, 2018 Cited in Related Chinese Application No. 2014-10698668.8.

Japanese Office Action dated Nov. 7, 2018 Cited in Related Japanese Application No. 2014-238759.

* cited by examiner

FIG. 2

```
SQL
SELECT  PID,NAME,CITY
 FROM   PERSONS
WHERE   CITY='CITY1'
```

DATA STORAGE DEVICE HAVING INTERNAL HARDWARE FILTER, DATA STORAGE METHOD AND DATA STORAGE SYSTEM

CROSS-REFERENCE TO RELATED APPLICATIONS

This application claims priority under 35 U.S.C. § 119(a) from Korean Patent Application No. 10-2013-0146351 filed on Nov. 28, 2013, the disclosure of which is hereby incorporated by reference.

BACKGROUND

Embodiments of the inventive concept relate generally to methods of filtering "big data". More particularly, embodiments of the inventive concept relate to memory devices including one or more embedded hardware filter(s) capable of extracting desired data from incoming big data. Other embodiments of the inventive concept relate to memory systems and methods of operating memory systems including this type of memory device.

Memory devices, individually or configured in a constellation, are important components of contemporary electronic and computational systems. Memory devices are usually arranged with one or more access control components such as a memory controller in a wide variety of memory systems. The data storage and data access capabilities provided by a particular memory system will vary with its application.

Data server systems are an important sub-class of memory systems. A data server system generally includes a server component and a database component. The "server" controls execution of an array of operations capable of writing data to, reading data from, and maintaining the operational integrity and usefulness of the database. The database will typically be implemented using one or more data storage devices including one or more different types of semiconductor memory devices. Many server systems are specifically designed to receive big data, efficiently store the received big data, and allow rapid access and retrieve to stored big data.

In the context of contemporary server systems, big data may be stored in either a "relational" database or a so-called Not Only Structured Query Language SQL or "NoSQL" database. Thus, desired data may be extracted from stored big data in a relational database or a NoSQL database using a structured query language (SQL) or a unique query language. In this regard, a NoSQL database facilitates the storing of data and the retrieval of stored data without relying on the tabular relationships of rational databases.

In typical operation, a data server system communicates big data retrieved from a database and stores it in a main memory associated with (accessible by) a server. A server processor then extracts desired data from the big data stored in the main memory. Unfortunately, only a portion of the big data stored in the server's main memory may be extracted as desired data during a given time period by server processor, and the main memory may have a limited data storage capacity. As a result, conventional methods of extracting desired data from big data using a server processor are relatively inefficient when viewed in the context of overall data traffic capabilities provided by contemporary server systems. Moreover, the constant need for the database to communicate big data to the server in order to extract desired data consumes a high level system resources.

SUMMARY

Embodiments of the inventive concept provide a memory system adapted for use in a data processing system that markedly reduces the volume of data that must be communicated between a database (secondary) memory and a primary memory arranged in a data storage device of the memory system.

In one embodiment, the inventive concept is directed to a data storage device configured for use in a memory system including a host and comprising; a host controller that receives from the host a filtering command and a read command directed to desired data among big data stored in a secondary memory, wherein the secondary memory serves as a database storing the big data, an internal hardware filter disposed in the data storage device functionally adjacent to the secondary memory, and configured to receive first read data from the secondary memory in response to a first read command derived from the read command, and to filter the received first read data according to filtering condition data derived from the filtering command to generate first filtered data, and a memory controller configured to store the first filtered data generated by the internal hardware filter in a primary memory separate in the data storage device from the secondary memory, and thereafter to communicate the first filtered data stored in the primary memory to the host in response to the read command.

In another embodiment, the inventive concept is directed to a data storage device configured for use in a memory system including a host. The data storage device comprising; a host controller that receives from the host a filtering command and a read command directed to desired data among big data stored in a first secondary memory and a second secondary memory, wherein the first secondary memory and the second secondary memory collectively serve as a database storing the big data, a first internal hardware filter disposed in the data storage device functionally adjacent to the first secondary memory, and configured to receive a first portion of read data from the first secondary memory in response to a first read command derived from the read command, and to filter the received first portion of read data according to filtering condition data derived from the filtering command to generate a first portion of filtered data, a second internal hardware filter disposed in the data storage device functionally adjacent to the second secondary memory, and configured to receive a second portion of read data from the second secondary memory in response to a first read command, and to filter the received second portion of read data according to the filtering condition data to generate a second portion of filtered data, and a memory controller configured to store the first and second filtered data in a primary memory separate in the data storage device from the first secondary memory and the second secondary memory, and thereafter to communicate the first and second filtered data stored in the primary memory to the host in response to the read command.

In another embodiment, the inventive concept is directed to a method of operating a data storage device adapted for use in a memory system including a host, the data storage device being embedded with a secondary memory, a primary memory, and an internal hardware filter disposed functionally adjacent to the secondary memory. The method comprises; receiving read data in the internal hardware filter from the secondary memory, filtering the read data using filtering condition data stored in the internal hardware filter to generate filtered data, storing the filtered data in the primary memory, and communicating the filtered data stored in the primary memory to the host.

BRIEF DESCRIPTION OF THE DRAWINGS

Certain embodiments of the inventive concept are illustrated in relevant part in the accompanying drawings of which:

FIG. 2 is a table listing selected entries for an exemplary Structured Query Language (SQL) that may be used in the data processing system of FIG. 1;

DETAILED DESCRIPTION

The inventive concept will now be described more fully with reference to the accompanying drawings in which embodiments of the invention are illustrated. This inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
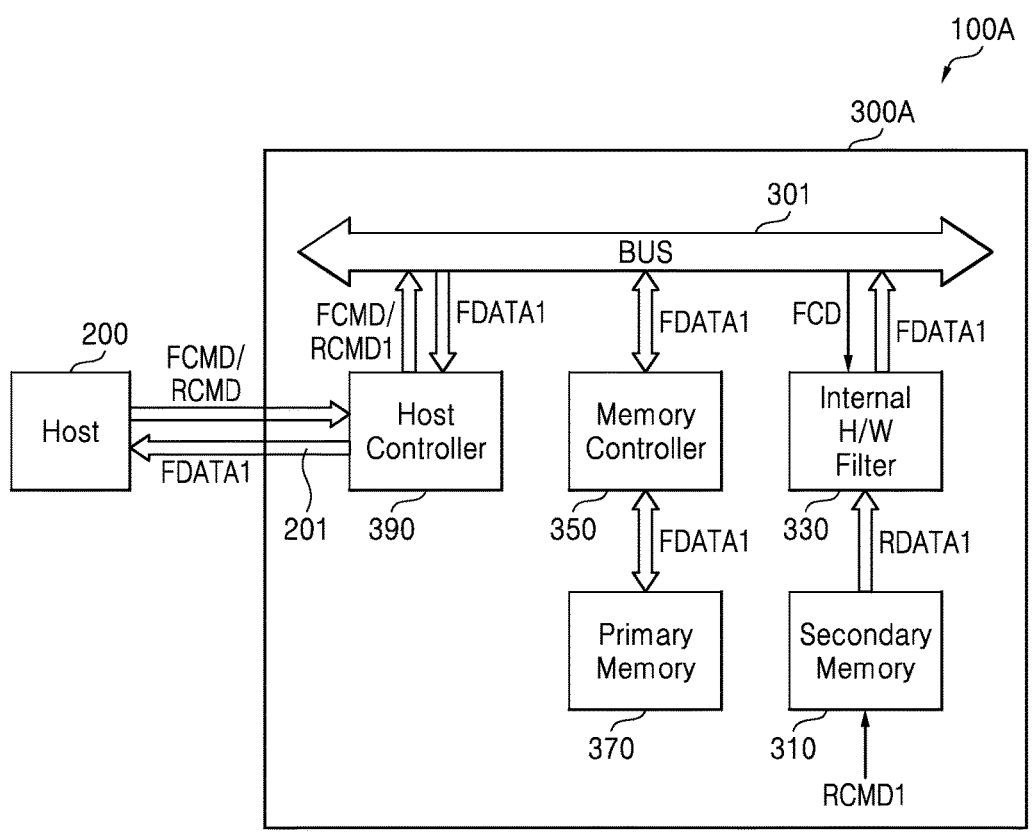
FIG. 1 is a block diagram illustrating a data processing system according to an embodiment of the inventive concept.

Figure (FIG. 1 is a block diagram illustrating a data processing system according to an certain embodiments of the inventive concept. Referring to FIG. 1, a data processing system 100A generally comprises a host 200 and a data storage device 300A.

In certain embodiments, the data processing system 100A may be a database management system (DBMS) or a relational database management system (RDBMS). The DBMS may include a column-oriented DBMS and/or a row-oriented DBMS. Well-known database management systems (DBMS) include MySQL, PostgreSQL, SQLite, Microsoft SQL Server, Microsoft Access, Oracle, SAP, dBASE, FoxPro, IBM DB2, FilemakerPro, etc.

The host 200 may be used to control the overall operation of the data storage device 300A. In this regard, the data storage device 300A may be controlled to execute write, read, and/or filtering operations in response to various commands received from the host 200. The host 200 and data storage device 300A may be configured to exchange data using one or more of a number of conventionally understood data communication protocols, such as Serial Advance Technology Attachment (SATA), Serial Attached SCSI (SAS), Peripheral Component Interconnect express (PCIe), etc.

The data storage device 300A comprises in relevant part; a bus 301, a secondary memory 310, an internal hardware filter 330, a memory controller 350, a primary memory 370, and a host controller 390.

In certain embodiments, the data storage device 300A may be implemented as an "all-in-one" data storage device. For example, the data storage device 300A may be embodied in a solid state drive (SSD), an embedded SSD (eSSD), and/or a hard disc drive (HDD). Accordingly, when the data storage device 300A is embodied in a SSD or an eSSD, the data processing system 100A may be embodied in a data processing system including the SSD or the eSSD.

The secondary memory 310 may be used to provide first read data RDATA1 to the internal hardware filter 330 in response to a read command RCMD. The first read data RDATA1 may be big data, and the secondary memory 310 may provide the functionality of a database.

The secondary memory 310 may be implemented with one or more nonvolatile, semiconductor memory devices, such as an electrically erasable programmable read-only memory (EEPROM), a flash memory, a magnetic random access memory or RAM (MRAM), a spin-transfer torque MRAM, a conductive bridging RAM (CBRAM), a ferroelectric RAM (FeRAM), a resistive RAM (RRAM), a resistive RAM (RRAM), a nanotube RRAM, a polymer RAM (PoRAM), a nano floating gate memory (NFGM), a holographic memory, a molecular electronics memory device, or an insulator resistance change memory.

For purposed of the current description, it is assumed that the secondary memory 310 is either a NAND flash memory or a NOR flash memory.

The internal hardware filter 330 may be used to filter the first read data RDATA1 provided by the secondary memory 310 according to filtering condition data (FCD) provided by the host controller 390 and/or the host 200 via the bus 301. In response to the provided FCD, the internal hardware filter 330 provides first filtered data FDATA1 to the bus 301. As the internal hardware filter 330 is "internally" embodied within the data storage device 300A, as opposed to be provided by some server processor, the memory system resources required to obtain the first filtered data FDATA1 (e.g., the resources involved in communicating a stream of first read data RDATA1 from the secondary memory 310 to the primary memory 370) may be markedly reduced over conventional data processing approaches. That is, since the internal hardware filter 330 disposed between the secondary memory 310 and bus 301 is capable of effectively filtering (or scanning) the first read data RDATA1 (e.g., big data) received from the secondary memory 310, the volume of big data necessarily communicated from the secondary memory 310 to the primary memory 370 may be reduced.

When the data storage device 300A is embodied in a SSD and the secondary memory 310 may be embodied as a NAND flash memory cell array, and the volume of data passing from the SSD may be reduced by the advantageous disposition of the internal hardware filter 330 functionally adjacent to the NAND flash memory cell array. In this context, the phrase "functionally adjacent to" means that in at least one operational mode a first element of the data storage unit 300A (e.g., the internal hardware filter 330) receives data from a second element (e.g., the secondary memory 310) of the data storage unit 300A, and processes the received data before the data is materially processed by any other data processing element.

The filtering condition data FCD may be generated by the host controller 390 in response to a filtering command FCMD received from the host 200. Here, a filtering command FCMD may include one or more commands and/or queries indicating a particular type, form and/or quality of "desired data" derived from big data received from a database. In certain embodiments, a filtering command FCMD may be defined as a vendor command.

The memory controller 350 may be configured to receive the first filtered data FDATA1 provided by the internal hardware filter 330 via the bus 301, and store the first filtered data FDATA1 in the primary memory 370. Thereafter, the first filtered data FDATA1 stored in the primary memory 370 may be read and communicated to (e.g.,) the host controller 390 through the bus 301.

The primary memory 370 may be embodied as a dynamic random access memory (DRAM), a static random access memory (SRAM), a thyristor RAM (T-RAM), a zero-capacitor RAM (Z-RAM), or a Twin Transistor RAM (TTRAM).

The host 200 and the data storage device 300A may be configured to communicate data in various forms and types via the host controller 390. Thus, the host controller 390 may be used to receive and communicate (or "pass") the first filtered data FDATA1 from the primary memory 370 to the host 200 using one or more data signal line(s) 201 connecting the host 200 and data storage 330A. The data signal line(s) 201 may be electrical and/or optical in this regard, and may be variously configured as will be appreciated by those skilled in the art.

FIG. 2 is a table listing selected entries of an exemplary Structured Query Language (SQL) that might be used in the context of the data processing system of FIG. 1. Of course, any one of a number of different SQLs might be used as a programming language capable of managing the definition and exchange of data in a RDBMS consistent with an embodiment of the inventive concept.

The SQL illustrated in FIG. 2 is a simple illustrative example describing an operation by the data processing system 300A, wherein big data is filtered according to color names PID, NAME, and CITY as a column list, PERSONS as a table, and CITY='CITY1' as a column operator value.

Figure 3:
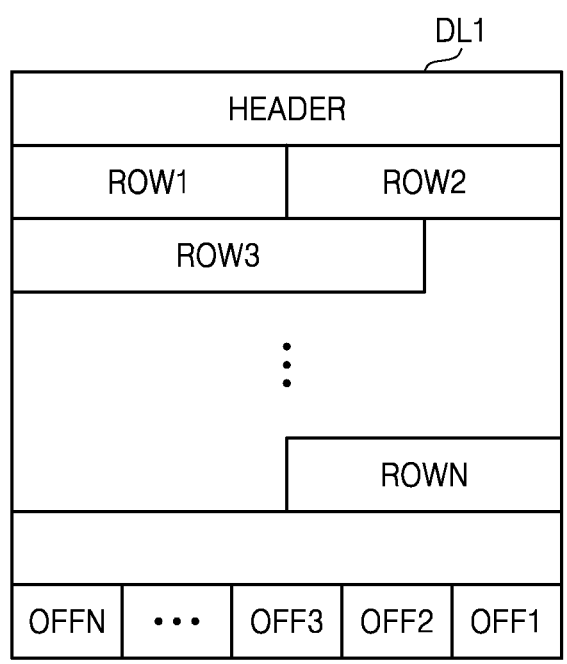
FIGS. 3 and 4 are respective conceptual illustrations showing exemplary data formats or layouts for a database (secondary) memory that may be used in certain embodiments of the inventive concept.
Figure 4:
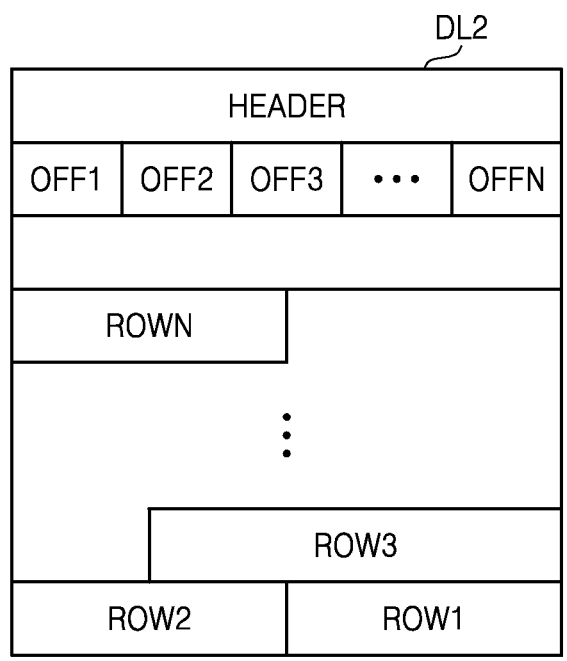

FIGS. 3 and 4 are respective conceptual illustration describing different data formats or layouts that might be used in a database consistent with an embodiment of the inventive concept. Referring to FIGS. 3 and 4, a first data layout DL1 used to store data in a first database is different from a second data layout DL2 used to store data in a second database. Of note, the respective layout positions for a header (HEADER), N rows (ROW1 to ROWN), and related row offsets (OFF1 to OFFN) may be different or the same as between data layout DL1 and DL2.

Additionally, a particular "row direction" (i.e., a direction in which a row value increases) as well as a "row offset direction" may be different according to each data layout DL1 and DL2. Data type(s) supported by the database may be differently defined according to each data layout DL1 and DL2. As a result, the host 200 may communicate one or more data indications or data identifiers that distinguish between different database types in conjunction with data queries for data stored by the data storage device 300A.

Figure 5:
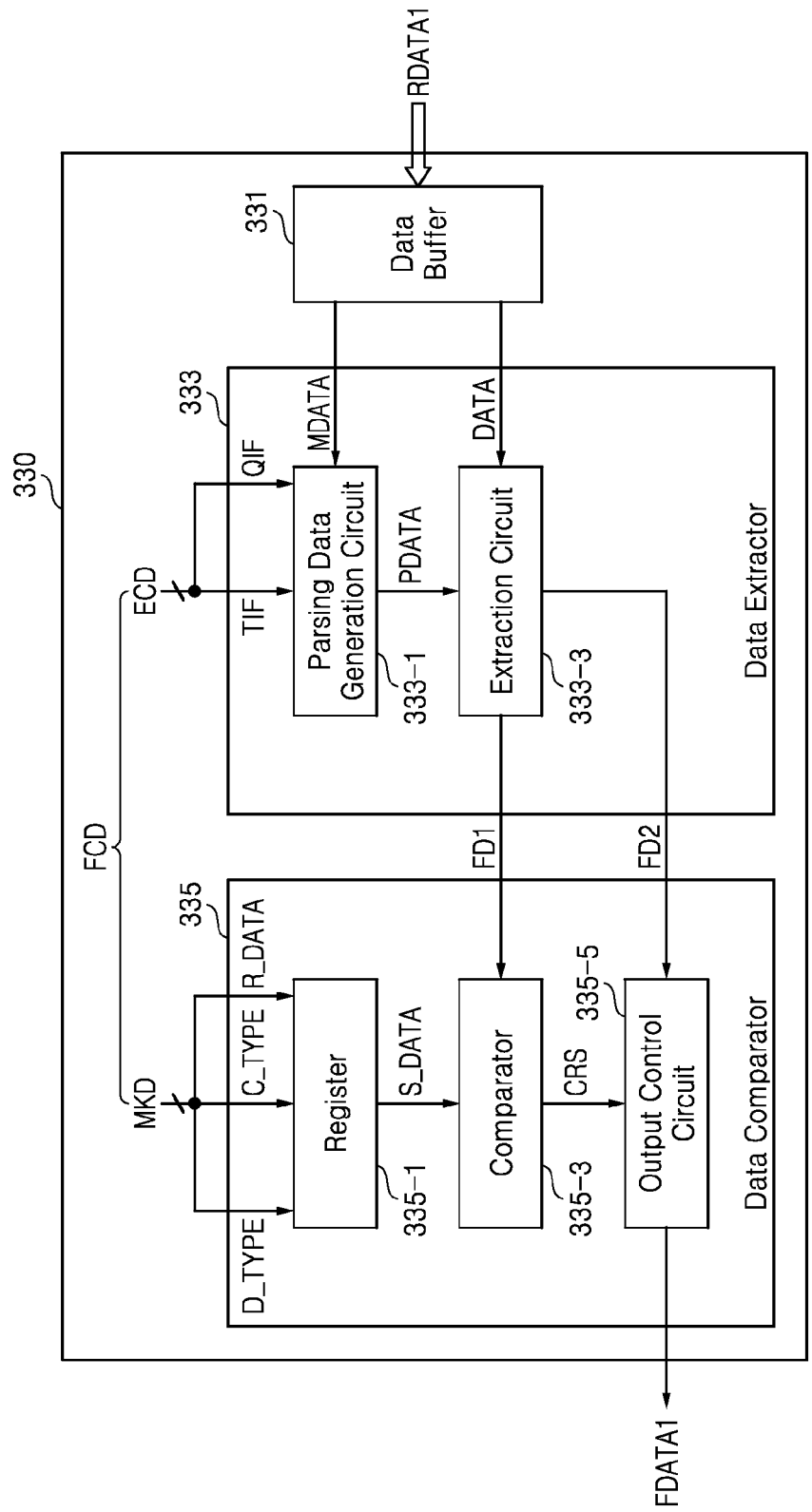
FIG. 5 is a block diagram further illustrating in one example the internal hardware filter 330 of FIG. 1.

FIG. 5 is a block diagram further illustrating in one example the internal hardware filter 330 of FIG. 1. Referring to FIGS. 1 and 5, the internal hardware filter 330 comprises in relevant part; a data buffer 331, a data extractor 333, and a data comparator 335.

The data buffer 331 may be used to buffer the first read data RDATA1 provided by the secondary memory 310. For example, the data buffer 331 may be used to buffer page data, assuming that data buffer 331 is embodied as a SRAM.

Hence, the data buffer 331 may be used to communicate both metadata (MDATA) and corresponding data (DATA) portions of the first read data RDATA1 to the data extractor 333 in response (e.g.,) to a corresponding address provided (e.g.,) from the data extractor 333. The corresponding address may be identified or defined in response to extraction condition data ECD—one part of the received filter condition data FCD. That is, the data extractor 333 may cause metadata and corresponding data included in the first read data RDATA1 to be read from the data buffer 331, where the metadata includes (e.g.,) a header, one or more offset(s), and/or one or more pointer(s).

In a relational database, the corresponding data (DATA) may be referred to by row, record, and/or tuple. Also in a relational database, a column may be referred to by field or attribute.

More generically stated, the data extractor 333 may distinguish between first extraction data (or first filtering data FD1) and second extraction data (or second filtering data FD2) in relation to the first read data RDATA1 and in response to the received extraction condition data ECD portion of the filtering condition data FCD.

In the particular embodiment illustrated in FIG. 5, the data extractor 333 comprises a parsing data generation circuit 333-1 and an extraction circuit 333-3.

The parsing data generation circuit 333-1 may be used to generate data from the first read data RDATA1 (e.g., parsing data PDATA) for parsing columns included in a row. Thereafter, the resultant parsing data may be communicated to the extraction circuit 333-3 based on the extraction condition data ECD and the metadata MDATA. In this regard, the parsing data generation circuit 333-1 may also be used to store the extraction condition data ECD.

According to certain applicable definitions, the extraction condition data ECD may include classification data (TIF) capable of classifying between columns and between database types (e.g., SQL types or unique query language types). The extraction condition data ECD may also include column extraction data (QIF) capable of extracting a particular column to be the object of a comparison operation performed by the data comparator 335.

In further regard to the foregoing, the extraction circuit 333-3 may be used to extract the first extraction data FD1 and second extraction data FD2 from each row of the first read data RDATA1 in response to (or "based on") the parsing data PDATA received from the parsing data generation circuit.

The data comparator 335 illustrated in FIG. 5 comprises a register 335_1, a comparator 335_3, and an output control circuit 335-5. In its operation, the data comparator 335 compares the matching key data MKD included derived from the filtering condition data FCD with the first extraction data FD1 to determine whether to output the second extraction data FD2 as first filtered data FDATA1 according to a comparison result.

To accomplish this, the register 335-1 may be used to store the matching key data MKD. In this regard, the register 335-1 may be embodied as a SRAM serving as a data buffer of sorts. The matching key data MKD includes type indication data (D_TYPE) indicating data type, operator indication data (C_TYPE) indicating an operator type, and extraction indication data (R_DATA) indicating data (e.g., a column value to be extracted).

An operator type may be, e.g., "equal (=)", "not equal (< > or !=)", "greater than (>)", "less than (<)", "greater than or equal (<=)", or "less than or equal (<=)".

The comparator 335-3 compares reference data S_DATA provided by the register 335-1 with the first extraction data FD1, and generates a comparison signal CRS according to the comparison result. Here, the reference data S_DATA may be generated based on a portion or all of the matching key data MKD.

The output control circuit 335-5 may be used to determine whether or not to output the second extraction data FD2 in response to the comparison signal CRS. For example, when the operator indication data C_DATA is "equal (=)" and the extraction indication data R_DATA included in the reference data S_DATA is the same as the first extraction data FD1, then the output control circuit 335-5 will output the second extraction data FD2 as first filtered data FDATA1. Under other conditions, the output control circuit 335-5 will not output the second extraction data FD2 as first filtered data FDATA1.

Figure 6:
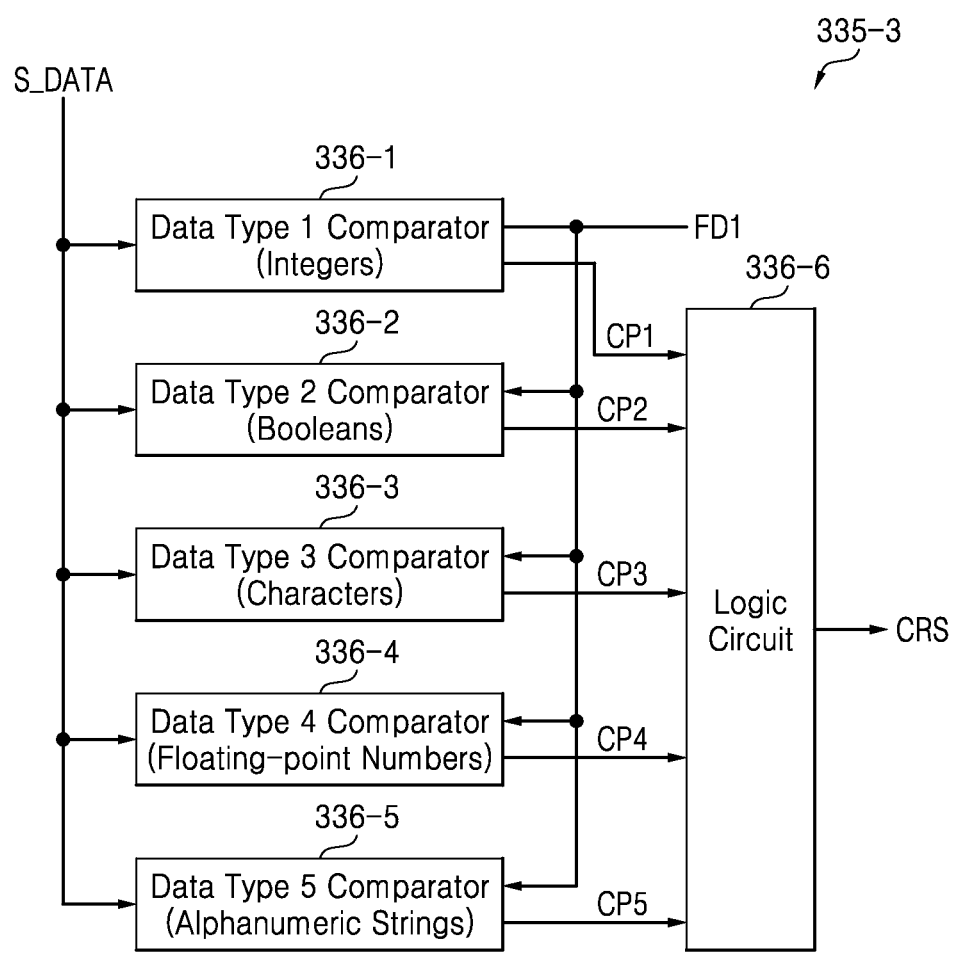
FIG. 6 is a block diagram further illustrating in one example the comparator 335-3 of FIG. 5.

FIG. 6 is a block diagram further illustrating in one example the comparator 335_3 of FIG. 5. Referring to FIGS. 5 and 6, the comparator 335-3 comprises in relevant part a plurality of data type comparators 336-1, 336-2, 336-3, 336-4 and 336-5 (collectively, 336-1 through 336-5), as well as a logic circuit 336-6.

The reference data S_DATA may be used to "set" each of the data type comparators 336-1 through 336-5. Here, the reference data S_DATA may include type indication data (D_TYPE), operator indication data (C_TYPE), and/or extraction indication data (R_DATA). The type indication data D_TYPE may be used to characterize data by size and/or type. Each of the data type comparators 336-1 through 336-5 compares the received extraction indication data R_DATA with coincidently received first extraction data FD1 in order to generate corresponding comparison signals CP1, CP2, CP3, CP4 and CP5 (collectively, "CP1 through CP5") according to a respective comparison result.

"Data type" may be a classification capable of distinguishing various types of data. For example, representative data type may include; integer, Boolean, character, floating-point number, and/or alphanumeric string.

The first data type comparator 336-1 may be used to compare integers included in the extraction indication data R_DATA and first extraction data FD1, and the second data type comparator 336-2 may be used to compare Booleans included in the extraction indication data R_DATA and first extraction data FD1, and so on for any reasonable number of data types 'k' and corresponding data type comparator(s) 335-k.

Then, in the specific illustrated example of FIG. 6, the logic circuit 336-6 may be used to perform a logical operation on the received comparison signals CP1 through CP5 in order to generate a comparison signal CRS. For example, the logic circuit 336-6 may be embodied in a XOR gate.

For convenience of description, only five (5) data type comparators 336-1 through 336-5 have been illustrated in FIG. 6 as an example. The number of data type comparators 335-k actually used in various embodiments of the inventive concept will vary according to design of the data received by the comparator 335-3.

Figure 7:
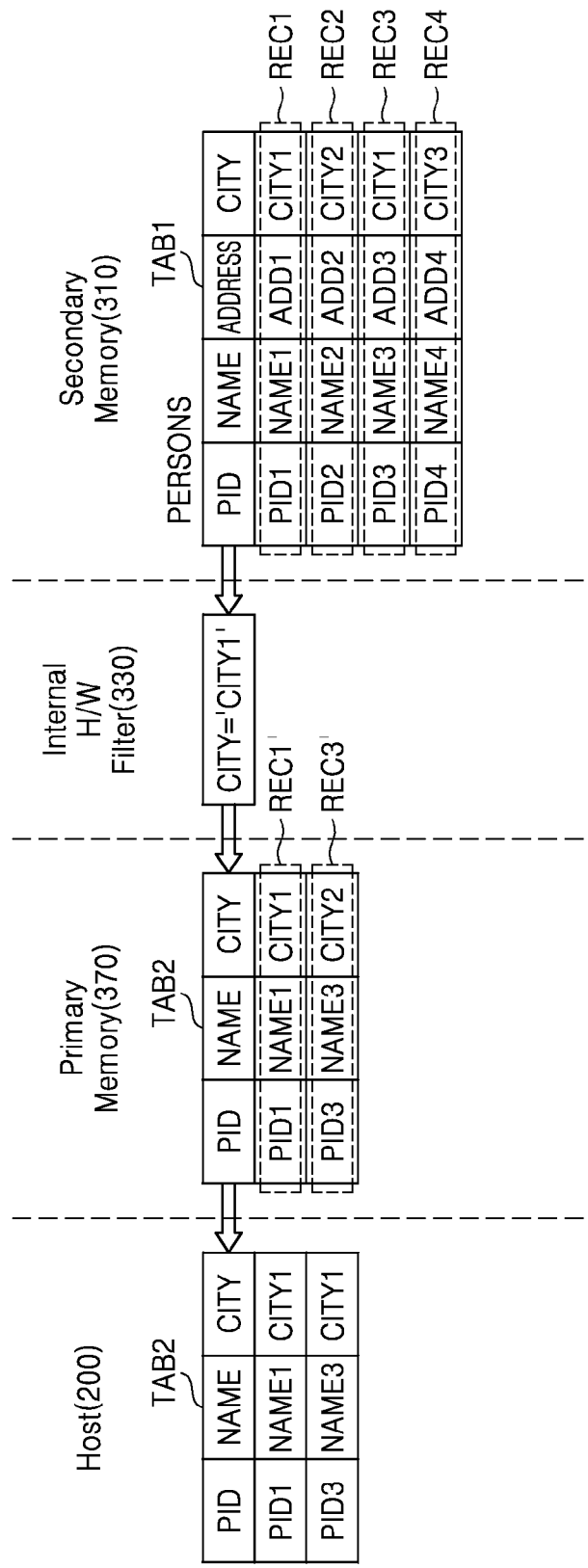
FIGS. 7, 8, 13, 15 and 16 are respective conceptual diagrams that variously illustrate exemplary flows of data through data processing systems consistent with an embodiment of the inventive concept.

FIG. 7 is a conceptual diagram describing an exemplary flow of data in the data processing system of FIG. 1. In this regard, it is again assumed that data storage device 300A of FIGS. 1, 5 and 6 provides the first filtered data FDATA1 previously described in accordance with the SQL example shown in FIG. 2.

Thus, according to the SQL illustrated in FIG. 2, the type indication data D_TYPE represents characters, the operator indication data C_TYPE represents "equal (=)", the extraction indication data R_DATA represents a column value CITY1, the classification data TIF includes data for classifying each column name PID, NAME, and CITY to be extracted among column names PID, NAME, ADDRESS, and CITY included in a table TAB1, and the column extraction data QIF represents a column name CITY to extract. Here, according to the reference data S_DATA, a third data type comparator 336-3 of the comparator 335-3 may operate so as to compare between characters.

Figure 9:
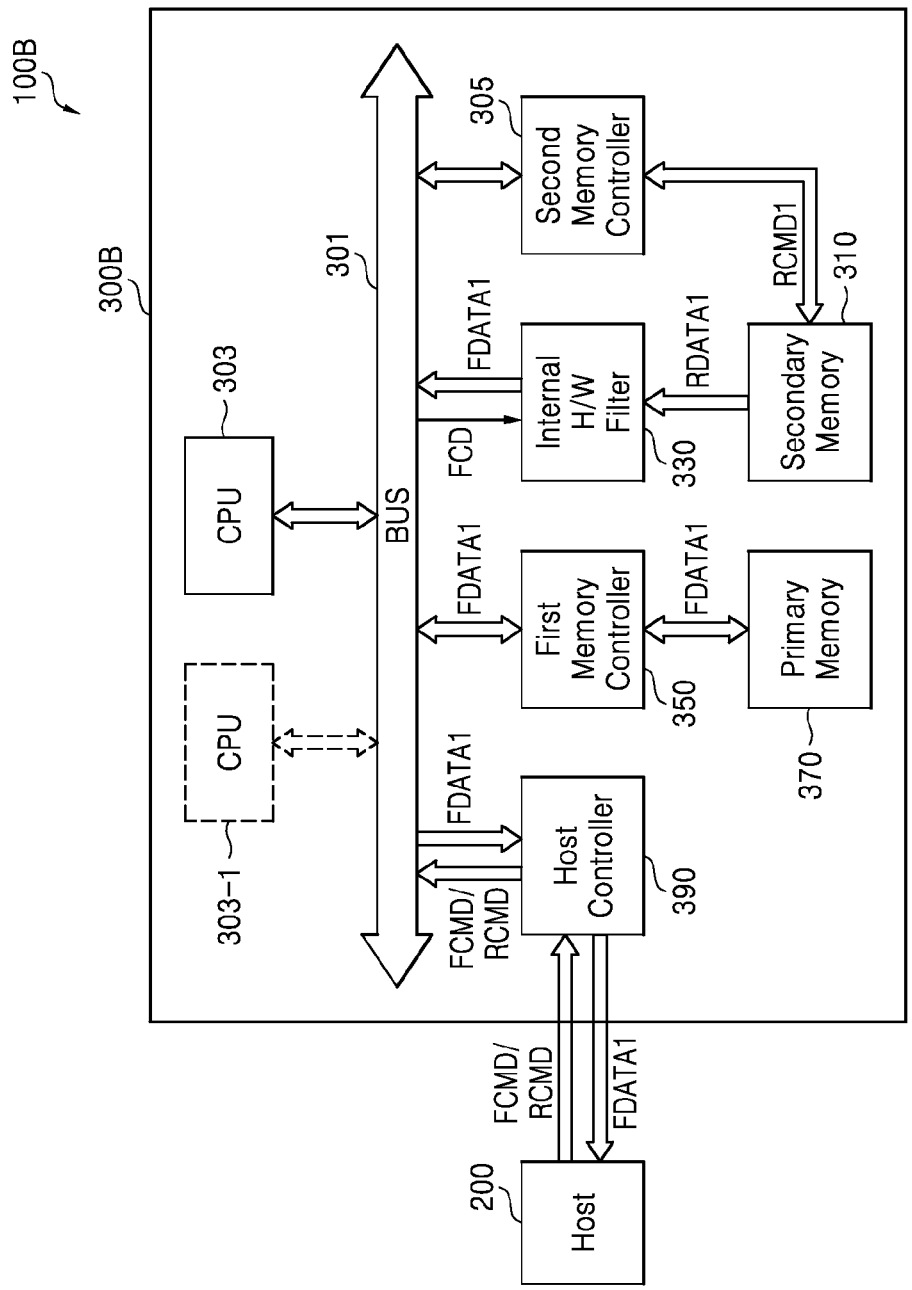
FIG. 9 is a block diagram illustrating a data processing system according to another embodiment of the inventive concept.
Figure 14:
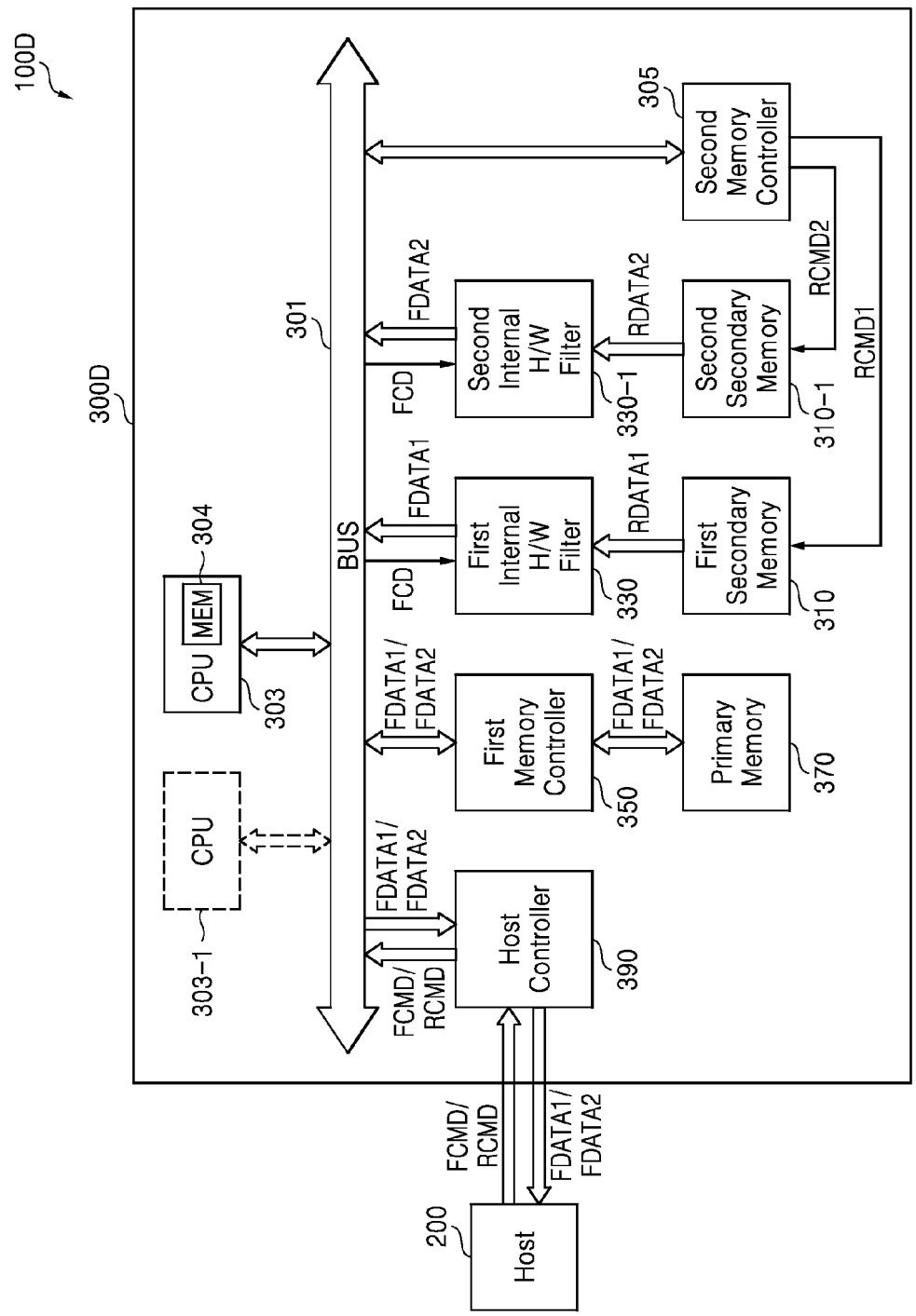

The filtering condition data FCD may be set or programmed in the internal hardware filter 330 according to firmware or an application programming interface (API) controlled (e.g.,) by a Central Processing Unit like CPU 303 of FIG. 9 or FIG. 14.

The firmware or the API may be controlled by the CPU 303 after being loaded from the secondary memory 310, or from some other nonvolatile memory associated with the primary memory 370. By operation of the firmware or API, extraction condition data ECD extracted from the filtering condition data FCD may be programmed in the parsing data generation circuit 333-1, and matching key data MKD of the filtering condition data FCD may be programmed in the register 335-1.

A first table (TAB1) having a name 'PERSONS' is output from the first secondary memory 310 to the first internal hardware filter 330 based on a first read command RCMD1.

The first read data RDATA1 includes the first table TAB1 and metadata related to the data of the first table TAB1. The data buffer 331 of the first internal hardware filter 330 receives a first row (REC1) including column entries (or values) PID1, NAME1, ADD1, and CITY1 from the secondary memory 310.

The data buffer 331 provides the metadata related to the first row REC1 to the parsing data signal generator 333-1 when the first row REC1 (i.e., data (DATA) is communicated to the extraction circuit 333-3 in response to a corresponding address. That is, the parsing data signal generator 333-1 may read the metadata (MDATA) related associated with the first row REC1 from the data buffer 331, and the extraction circuit 333-3 may read the corresponding data (DATA) from the data buffer 331.

The parsing data signal generator 333-1 may then be used to communicate parsing data PDATA to the extraction circuit 333-3 based on the classification data TIF and the column extraction data QIF. For example, the parsing data PDATA includes each column PID, NAME, and CITY, or a start position or a start address of each column value PID1, NAME1, and CITY.

The extraction circuit 333-3 may then communicate an extracted a column value CITY1 included in a column CITY to the comparator 335-3 as the first extraction data FD1 based on the parsing data PDATA. Moreover, the extraction circuit 333-3 extracts the second extraction data FD2 including column values PID1, NAME1, and CITY1 from the first row REC1, and outputs the extracted second extraction data FD2 to the output control circuit 335-5 based on the parsing data PDATA.

The comparator 335-3 compares a column value CITY1 included in the reference data S_DATA with a column value CITY1 included in the first extraction data FD1, and outputs a comparison signal CRS indicating a positive (i.e. matching) comparison result. The output control circuit 335-5 then outputs the second extraction data FD2 including the column values PID1, NAME1, and CITY1 to the bus 301 as the first filtered data FDATA1 in response to the positive comparison signal CRS.

The memory controller 350 stores a row REC1' including the column values PID1, NAME1, and CITY1 in the primary memory 370. Continuously, the data buffer 331 of the first internal hardware filter 330 receives a second row REC2 including column values PID2, NAME2, ADD2, and CITY2 from the first secondary memory 310.

The data buffer 331 communicates metadata related to the second row REC2 to the parsing data signal generator 333-1, and the corresponding second row REC2 data to the extraction circuit 333-3 in response to a corresponding address. That is, the parsing data signal generator 333-1 reads metadata from the data buffer 331 while the extraction circuit 333-3 reads corresponding data from the data buffer 331.

The parsing data signal generator 333-1 communicates the parsing data PDATA to the extraction circuit 333-3 based on classification data TIF and column extraction data QIF. For example consistent with the working example of FIG. 7, the parsing data PDATA includes each column PID, NAME, and CITY, or a start position or a start address of each column value PID2, NAME2, and CITY2.

The extraction circuit 333-3 may then communicate the extracted column value CITY2 included in a column CITY to the comparator 335-3 as the first extraction data FD1 based on the parsing data PDATA. In addition, the extraction circuit 333-3 may be used to extract the second extraction data FD2 including the column values PID2, NAME2, and CITY2 from the second row REC2 and output the extracted second extraction data FD2 to the output control circuit 335-5 based on the parsing data PDATA.

The comparator 335-3 compares a column value CITY1 included in the reference data S_DATA with a column value CITY2 included in the first extraction data FD1, and outputs a comparison signal CRS representing mismatching according to a result of the comparison.

The output control circuit 335-5 does not output the second extraction data FD2 including the column values PID2, NAME2, and CITY2 in response to the comparison signal CRS representing mismatching. Continuously, the data buffer 331 of the first internal hardware filter 330 receives a third row REC3 including column values PID3, NAME3, ADD3, and CITY1 from the secondary memory 310.

The data buffer 331 communicates metadata related to the third row REC3 to the parsing data signal generator 333-1, and also communicates corresponding data of the third row REC3 to the extraction circuit 333-3 in response to a corresponding address. That is, the parsing data signal generator 333-1 reads the metadata from the data buffer 331 while the extraction circuit 333-3 read the corresponding data from the data buffer 331.

The parsing data signal generator 333-1 communicates parsing data PDATA to the extraction circuit 333-3 based on the classification data TIF and the column extraction data QIF. For example in the working example of FIG. 7, the parsing data PDATA includes each column PID, NAME, and CITY, or a start position or a start address of each column value PID3, NAME3, and CITY1.

The extraction circuit 333-3 may be used to communicate an extracted column value CITY1 included in a column CITY to the comparator 335-3 as the first extraction data FD1 based on the parsing data PDATA. Moreover, the extraction circuit 333-3 may be used to extract the second extraction data FD2 including column values PID3, NAME3, and CITY1 from a third row REC3, and outputs the extracted second extraction data FD2 to the output control circuit 335-5 based on the parsing data PDATA.

The comparator 335-3 compares a column value CITY1 included in the reference data S_DATA with a column value CITY1 included in the first extraction data FD1, and outputs a positive comparison signal CRS when these values match.

The output control circuit 335-5 may then output the second extraction data FD2 including the column values PID3, NAME3, and CITY1 to the bus 301 as the first filtered data FDATA1 in response to the positive comparison signal CRS.

The memory controller 350 stores a row REC3' including the column values PID3, NAME3, and CITY1 in the primary memory 370. That is, the memory controller 350 may store each of the column values PID3, NAME3, and CITY1 in a column corresponding to each of the column names PID, NAME, and CITY. Continuously, the data buffer 331 of the first internal hardware filter 330 receives a fourth row REC4 including column values PID4, NAME4, ADD4, and CITY3 from the secondary memory 310.

The data buffer 331 communicates metadata related to the fourth row REC4 to the parsing data signal generator 333-1 and corresponding data related to the fourth row REC4 to the extraction circuit 333-3 in response to a corresponding address.

The parsing data signal generator 333-1 may then communicate parsing data PDATA to the extraction circuit 333-3 based on the classification data TIF and the column extraction data QIF. For example in the working example of FIG. 7, the parsing data PDATA includes each column PID, NAME, and CITY, or a start position or a start address of each column value PID4, NAME4, and CITY3.

The extraction circuit 333-3 communicates an extracted column value CITY3 to the comparator 335-3 as the first extraction data FD1 based on the parsing data PDATA. Moreover, the extraction circuit 333-3 may be used to extract the second extraction data FD2 including the column values PID4, NAME4, and CITY3 from the fourth row REC4, and output the extracted second extraction data FD2 to the output control circuit 335-5 based on the parsing data PDATA.

The comparator 335-3 compares a column value CITY1 included in the reference data S_DATA with a column value CITY3 included in the first extraction data FD1, and outputs a positive comparison signal CRS when these values match.

The output control circuit 335-5 will not output the second extraction data FD2 including the column values PID4, NAME4, and CITY3 in response to a negative comparison signal CRS indicating a value mismatch. After a table TAB2 generated by the memory controller 350 is stored in the primary memory 370, the memory controller 350 reads the data contents of table TAB2 and communicates same to the host controller 390 via the bus 301.

The host controller 390 communicates the data contents of table TAB2 including a column value CITY1 to the host 200 according to the SQL of FIG. 2. After each column REC1 to REC4 is sequentially stored in the data buffer 331 in FIG. 7, each column REC1 to REC4 may be sequentially output to the data extractor 333.

Figure 8:
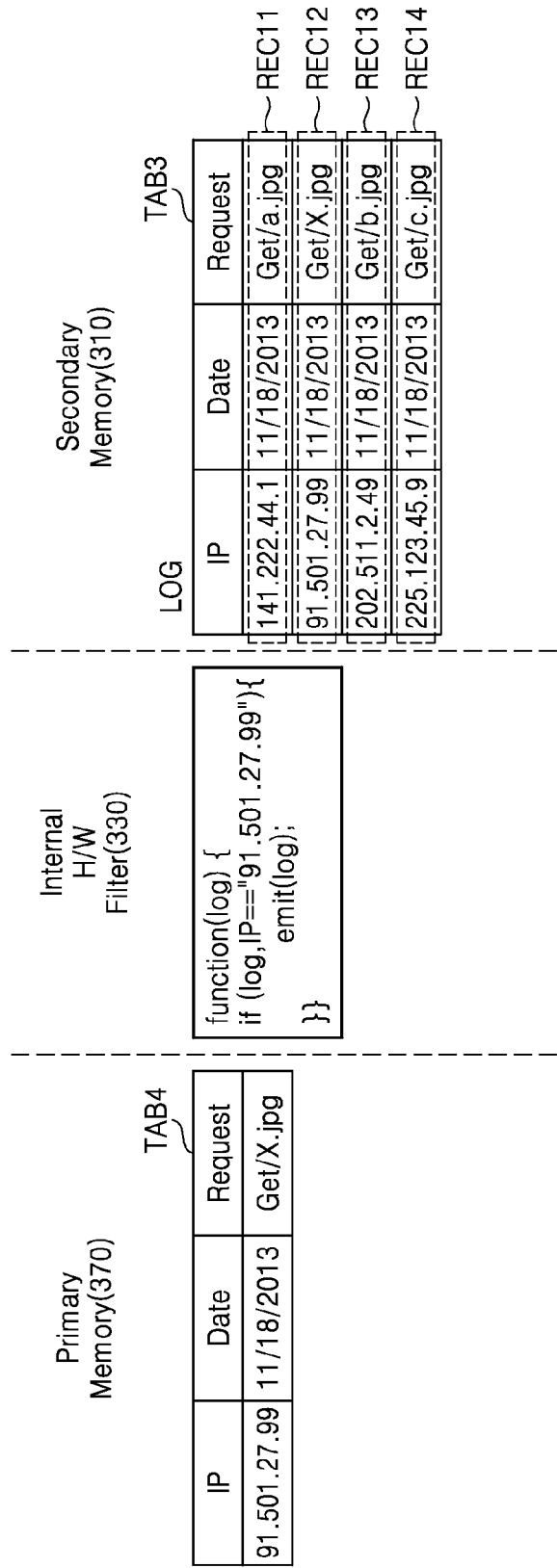

FIG. 8 is another conceptual diagram further describing a flow of data through the data processing system of FIG. 1. Here, it is assumed that operation of the data storage device 300A provides the first filtered data FDATA1 in accordance with a unique query language, such as a query language defined by a manufacturer of the data storage device 300A.

Reference in now made to FIGS. 1, 5, 6, and 8. According to the unique query language illustrated in FIG. 8, the type indication data D_TYPE indicates integers, the operator indication data C_TYPE represents "equal (=)", the extraction indication data R_DATA represents a column value 91, 501, 27, 99, the classification data TIF includes data for classifying each column name IP, Data, and Request, to be extracted from column names IP, Data, and Request included in a table TAB3, and the column extraction data QIF represents a column name IP to extract. Here, a first data type comparator 336-1 of the comparator 335-3 operates so as to compare integers in accordance with the reference data S_DATA.

The filtering condition data FCD may be programmed in the first internal hardware filter 330 using firmware or an API controlled by the CPU 303. For example, the extraction condition data ECD of the filtering condition data FCD may be programmed in the parsing data generation circuit 333-1, and matching key data MKD of the filtering condition data FCD may be programmed in the register 335-1.

A table TAB3 having a name of LOG is read from the secondary memory 310 through the hardware filter 330 in response to the first read command RCMD1. The first read command RCMD1 may be generated based on a read command RCMD received from the host 200.

Hence, the resulting first read data RDATA1 includes the data contents of the table TAB3 and as well as metadata related to table TAB3. The data buffer 331 of the first internal hardware filter 330 receives a first row REC11 including column values 141.222.44.1, Nov. 18, 2013, and a (e.g.,) "Get/a.jpg" instruction from the secondary memory 310.

The data buffer 331 than communicate the metadata related to the first row REC11 to the parsing data signal generator 333-1 the corresponding data of the first row REC11 to the extraction circuit 333-3 in response to a corresponding address.

The parsing data signal generator 333-1 communicates the parsing data PDATA to the extraction circuit 333-3 based on the classification data TIF and column extraction data QIF. For example, in the illustrated example of FIG. 8, the parsing data PDATA include each column IP, Date, and Request, or a start position or a start address of each column value 141.222.44.1, Nov. 18, 2013, and Get/a.jpg.

The extraction circuit 333-3 may then communicate an extracted column value 141.222.44.1 included in a column IP to the comparator 335-3 as the first extraction data FD1 based on the parsing data PDATA. Moreover, the extraction circuit 333-3 may also be used to extract the second extraction data FD2 including column values 141.222.44.1, Nov. 18, 2013, and Get/a.jpg from the first row REC11, and outputs the extracted second extraction data FD2 to the output control circuit 335-5 based on the parsing data PDATA.

The comparator 335-3 compares a column value 91.501.27.99 included in the reference data S_DATA with a column value 141.222.44.1 included in the first extraction data FD1, and accordingly outputs a negative comparison signal CRS indicating a mismatch of values.

The output control circuit 335-5 will not output the second extraction data FD2 including the column values 141.222.44.1, Nov. 18, 2013, and Get/a.jpg in response to the negative comparison signal CRS. Continuously, the data buffer 331 of the first internal hardware filter 330 receives a second row REC12 including column values 91.501.27.99, Nov. 18, 2013, and Get/X.jpg from the secondary memory 310.

The data buffer 331 communicates the metadata related to the second row REC12 to the parsing data signal generator 333-1 and the corresponding data related to the second row REC12 to the extraction circuit 333-3 in response to a corresponding address.

The parsing data signal generator 333-1 communicates the parsing data PDATA to the extraction circuit 333-3 based on the classification data TIF and the column extraction data QIF. For example, the parsing data PDATA includes each column IP, Date, and Request, or a start position or a start address of each column value 91.501.27.99, Nov. 18, 2013, and Get/X.jpg.

Hence, the extraction circuit 333-3 communicates and extracted column value 91.501.27.99 included in a column IP to the comparator 335-3 as the first extraction data FD1 based on the parsing data PDATA. Moreover, the extraction circuit 333-3 may be used to extract the second extraction data FD2 including the column values 91.501.27.99, Nov. 18, 2013, Get/X.jpg from the second row REC12 and outputs the extracted second extraction data FD2 to the output control circuit 335-5 based on the parsing data PDATA.

Now, the comparator 335-3 may be used to compare a column value 91.501.27.99 included in the reference data S_DATA with a column value 91.501.27.99 included in the first extraction data FD1, and will accordingly output a positive comparison signal CRS indicating matching values.

The output control circuit 335-5 will now output the second extraction data FD2 including the column values 91.501.27.99, Nov. 18, 2013, and Get/X.jpg to the bus 301 as the first filtered data FDATA1 in response to the positive comparison signal CRS.

The memory controller 350 stores a row including the column values 91.501.27.99, Nov. 18, 2013, and Get/X.jpg in the primary memory 370. Here, the memory controller 350 may generate column names IP, Date, and Request in which each of the column values 91.501.27.99, Nov. 18, 2013, and Get/X.jpg is stored, and store each of the column values 91.501.27.99, Nov. 18, 2013, and Get/X.jpg in a column corresponding to each of the column names IP, Date, and Request.

The second extraction data FD2 corresponding to a third row REC13 including column values 202.511.2.49, Nov. 18, 2013, and Get/b.jpg, and the second extraction data FD2 corresponding to a fourth row REC14 including column values 225.123.45.9, Nov. 18, 2013, and Get/b.jpg are not output by the first internal hardware filter 330.

FIG. 9 is a block diagram illustrating a data processing system according to another embodiment of the inventive concept. Referring to FIG. 9, a data processing system 100B generally comprises the host 200 and a data storage device 300B.

As before, the host 200 may be used to control the overall operation of the data storage device 300B. Except for the addition of CPU 303 and a second memory controller 305, the structure and operation of data storage device 300B shown in FIG. 9 are substantially the same as those previously described in relation to the data storage device 300A of FIG. 1. Here, the memory controller functionally associated with the primary memory 370 is referred to as a "first memory controller 350", while the memory controller functionally associated with the secondary memory 310 is referred to as a "second memory controller 305".

As before, the host 200 is assumed to generate a filtering command FCMD and a read command RCMD directed to the data storage device 300B. The CPU 303 may be used to control the operation of the second memory controller 305, the internal hardware filter 330, the first memory controller 350, and the host controller 390.

The CPU 303 may be configured to receive the filtering command FCMD via the host controller 390 and the bus 301, interpret the filtering command FCMD, generate corresponding filtering condition data FCD, and then program the filtering condition data FCD in the internal hardware filter 330 using the firmware or the API performed by the CPU 303.

The CPU 303 generates a command based on the read command RCMD output from the host 200, and outputs the generated command to the second memory controller 305. The second memory controller 305 generates a first read command RCMD1 in response to the command, and transmits the first read command RCMD1 to the first secondary memory 310.

The first secondary memory 310 may transmit the first read data RDATA1 to the internal hardware filter 330 in response to the first read command RCMD1. When the first secondary memory 310 is used as a database "indication data" that indicates a particular database type (or SQL type) as part of the filtering command FCMD.

As before, the filtering command FCMD may include the indication data and a query. Thus, in certain embodiments of the inventive concept, the filtering command FCMD may include the indication data, a query, and a read command RCMD. The query may be a SQL or a unique query language. In certain other embodiments of the inventive concept, the data storage device 300B may further comprises an additional CPU 303-1, where the CPU 303-1 may be used to generate a control sequence based on the filtering command FCMD received from the host 200. For example, a control sequence may include information regarding a table to be read, information regarding columns to be extracted from, or columns included within the table, information regarding a column value to be extracted, etc. This type of control sequence may also include a database type and/or a SQL type.

The CPU 303 may generate filtering condition data FCD based on the control sequence, and set the filtering condition data FCD in the first internal hardware filter 330 using the firmware or the API performed by the CPU 303.

Figure 10:
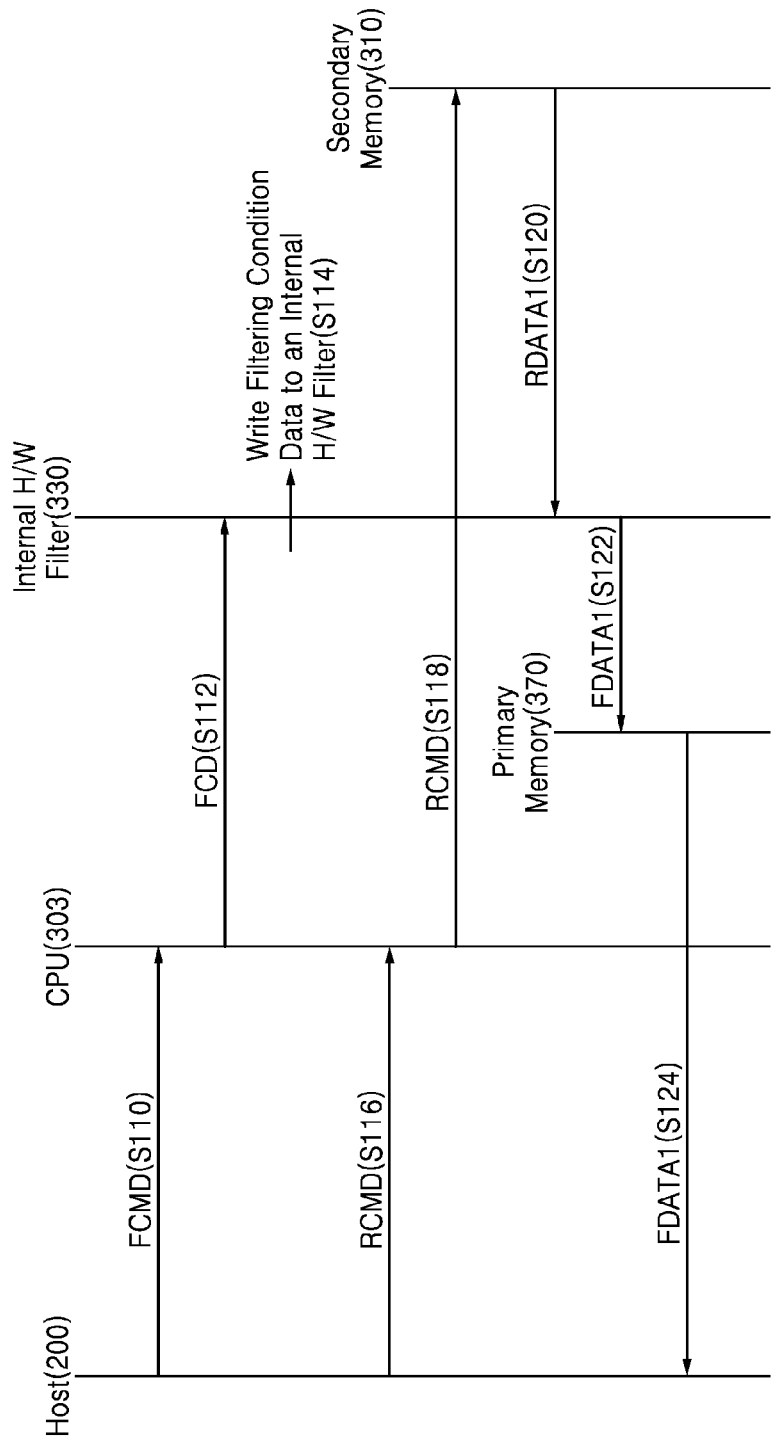
FIGS. 10 and 11 are respective diagrams illustrating certain methods of operation a data processing system consistent with embodiments of the inventive concept FIG. 9.

FIG. 10 is a conceptual diagram further describing an operating method for the data processing system of FIG. 9. Operation of the data processing system 100B is assumed to occur at a time when a filtering command FCMD includes both indication data and a query is received from the host 200. The query may be the SQL such as the one shown in FIG. 2 or a unique query language such as the one shown in FIG. 8. The following description draws upon the memory system descriptions above.

First, the CPU 303 receives the filtering command FCMD provided by the host 200 (S110). Using the CPU 303 and/or host controller 390, the data storage device 300B interprets the filtering command FCMD, generates corresponding filtering condition data FCD, and then communicates the filtering condition data FCD to the internal hardware filter 330 (S112). The filtering condition data FCD is now written to the internal hardware filter 330 (S114).

Thereafter, the CPU 303 receives a read command RCMD received from the host 200 (S116), generates a command based on the read command RCMD, and then communicates the generated command to the second memory controller 305. In response, the second memory controller 305 generates a first read command RCMD1 and communicates the first read command RCMD1 to the first secondary memory 310 (S118).

The secondary memory 310 communicates the first read data RDATA1 to the internal hardware filter 330 based on the first read command RCMD1 received from the second memory controller 305 (S120). As described above, the internal hardware filter 330 filters the first read data RDATA1 according to the filtering condition data FCD, and communicates the first filtered data FDATA1 to the first memory controller 350 via the bus 301, and then, the first memory controller 350 writes the first filtered data FDATA1 to the primary memory 370 (S122).

Then, the first memory controller 350 may be used to read the first filtered data FDATA1 from the primary memory 370 and pass it to the host 200 via through the bus 301 and/or host controller 390 (S124).

Figure 11:
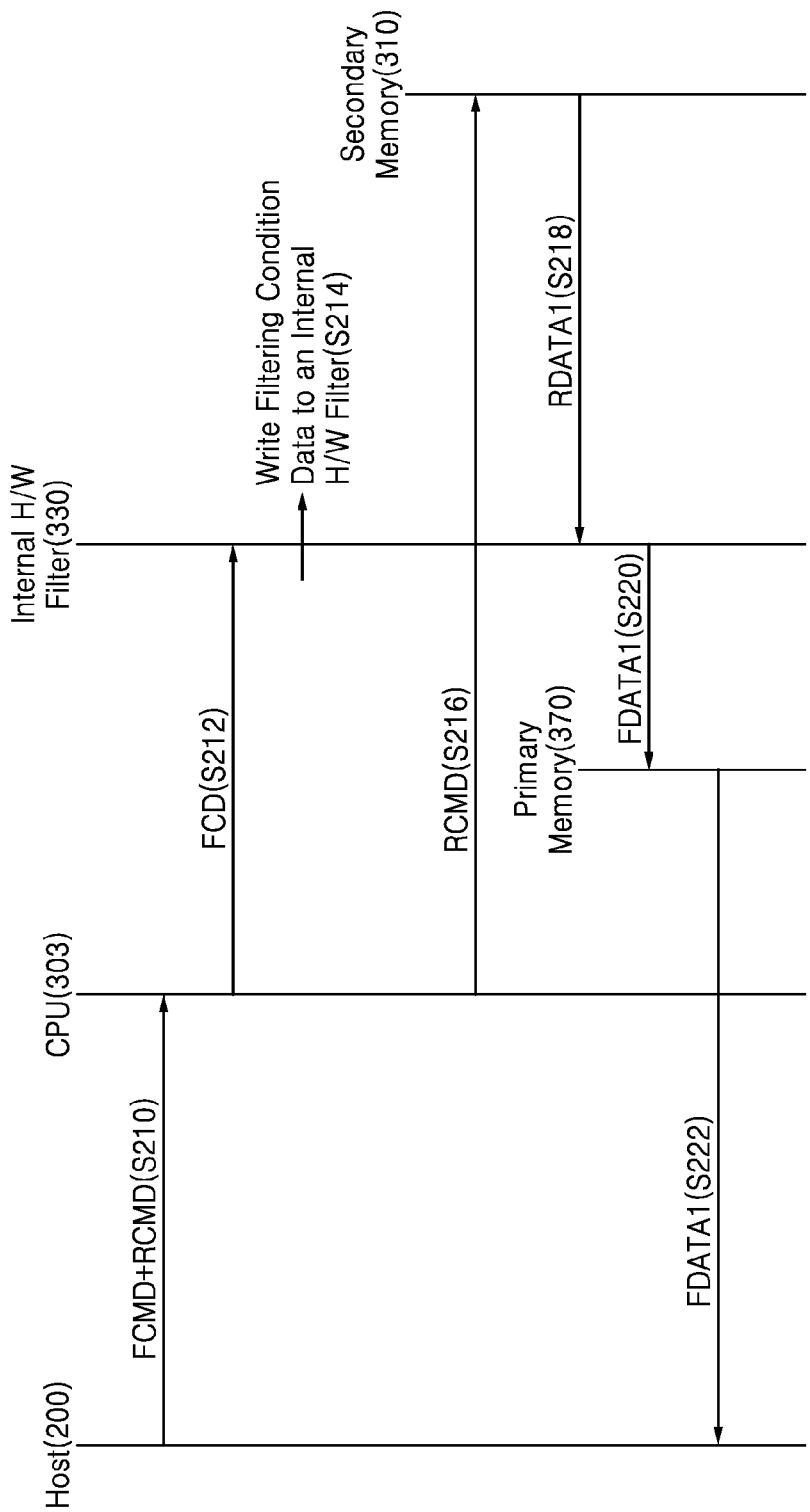

FIG. 11 is another conceptual diagram further describing an operating method for the data processing system of FIG. 9 under the same assumptions noted above.

The CPU 303 receives the filtering command FCMD including the read command RCMD (S210), interprets the indication data and the query included in the filtering command FCMD, generates the filtering condition data FCD according to the interpretation, and then communicates the filtering condition data FCD to the internal hardware filter 330 (S212). In this manner, the filtering condition data FCD may be written to the internal hardware filter 330 (S214).

When the CPU 303 communicates a command generated in response to the read command RCMD to the second memory controller 305, the second memory controller 305 generates a first read command RCMD1 based on the command, and communicates the first read command RCMD1 to the first secondary memory 310 (S216).

The secondary memory 310 communicates the first read data RDATA1 to the internal hardware filter 330 based on the first read command RCMD1 received from the second memory controller 305 (S218). As described above, the internal hardware filter 330 filters the first read data RDATA1 according to the filtering condition data FCD, and then communicates the first filtered data FDATA1 to the first memory controller 350 via the bus 301. The first memory controller 350 may now write the first filtered data FDATA1 to the primary memory 370 (S220).

Thereafter, the first memory controller 350 may be used to read the first filtered data FDATA1 stored in the primary memory 370, and pass the first filtered data FDATA1 to the host 200 via the bus 301 and/or the host controller 390 (S222).

Figure 12:
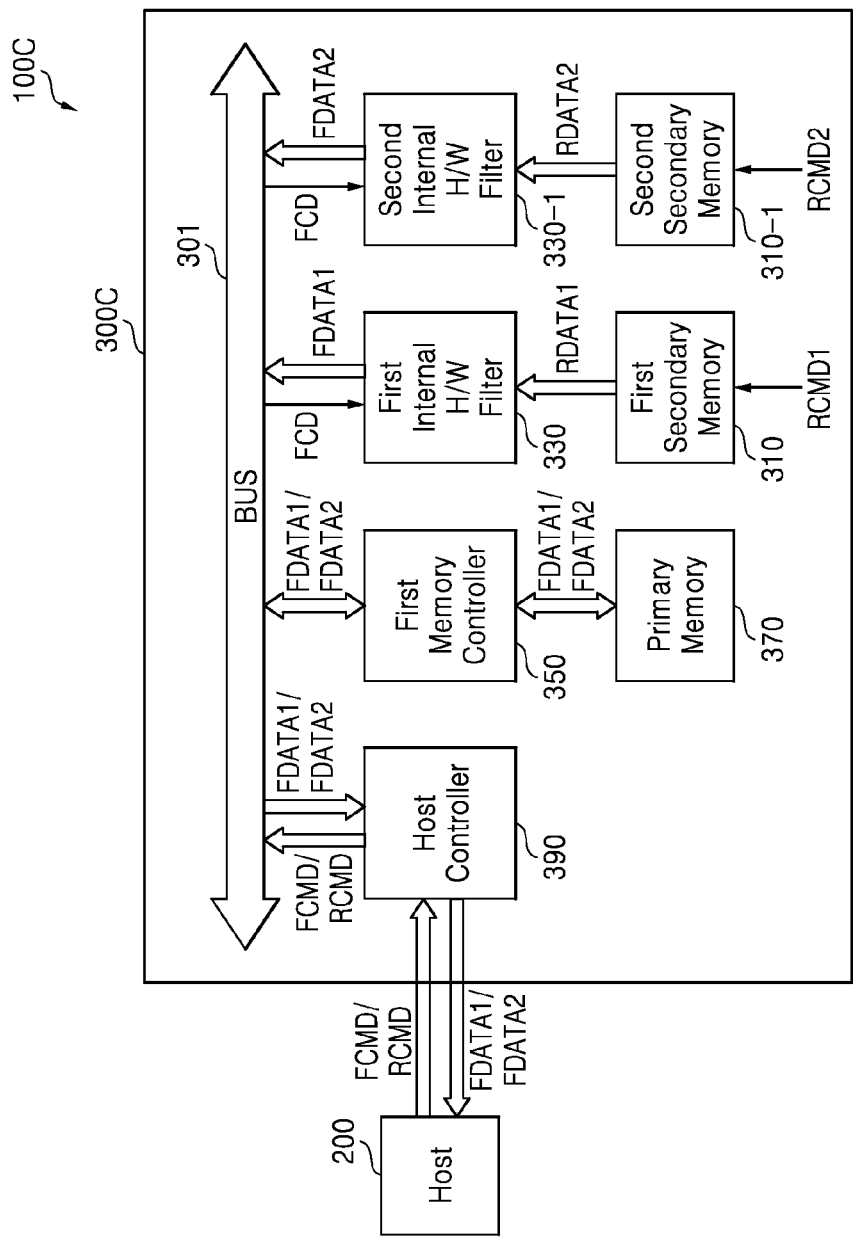
FIGS. 12 and 14 are respective block diagram illustrating various data processing systems according to other embodiments of the inventive concept.
Figure 13:
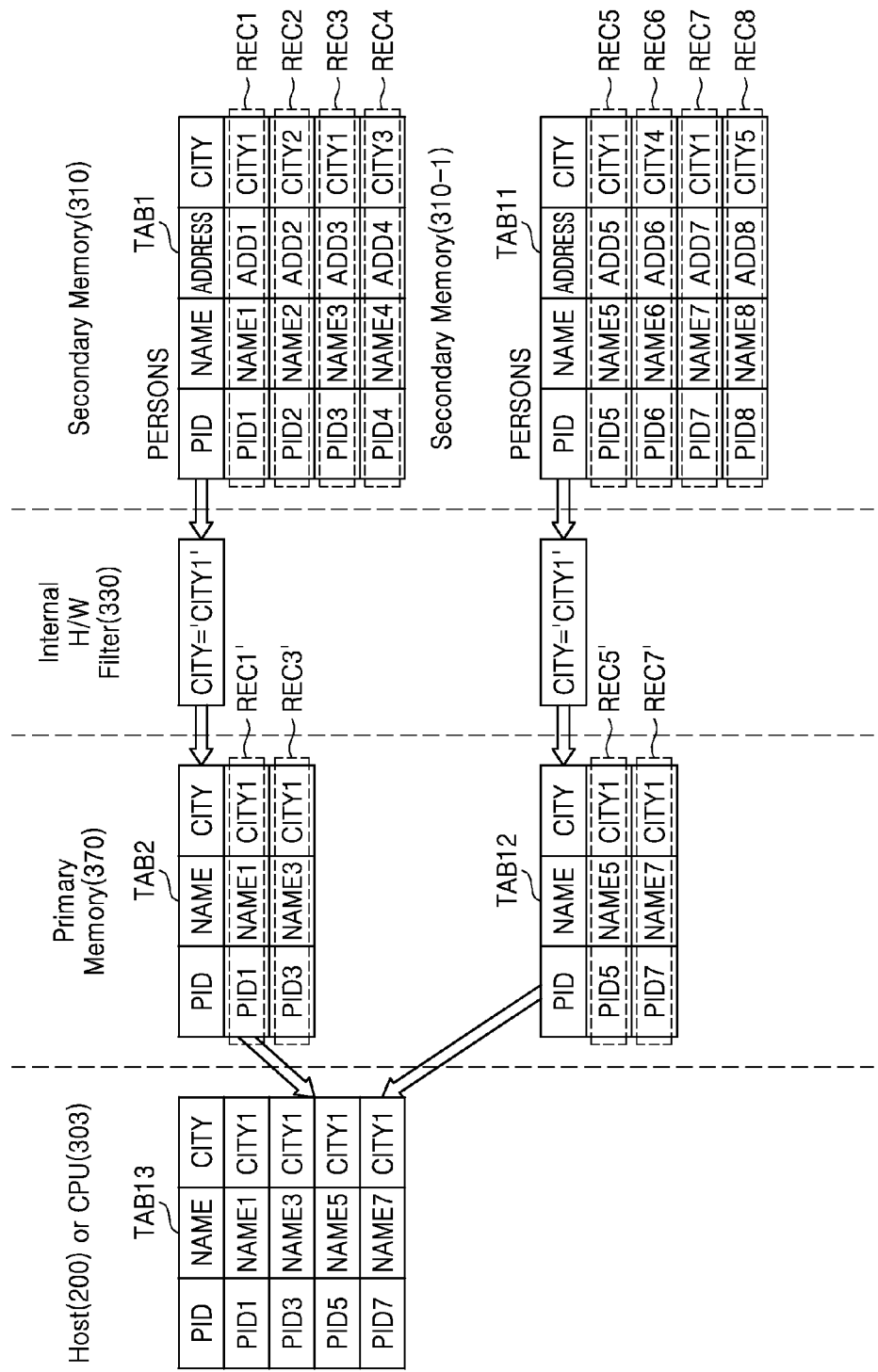

FIG. 12 is a block diagram illustrating a data processing system according to still another embodiment of the inventive concept. FIG. 13 is a conceptual diagram further describing the operation of the data processing system of FIG. 12.

Referring to FIG. 12, a data processing system 100C again generally includes the host 200 and a data storage device 300C. However, as shown in FIG. 13, data stored in a table labeled 'PERSONS' is stored in a dispersed manner among data stored in each of two (2) secondary memories 310 and 310-1.

That is, a first table TAB1 corresponding to a portion of a larger table of data is stored in a first secondary memory 310 while a second table TAB11 corresponding to another portion (e.g., a remaining portion) the table of data is stored in a second secondary memory 310-1. Each one of the multiple secondary memories is functionally associated (e.g., in a data channel relationship) with a corresponding (e.g., first and second) internal hardware filter.

For convenience of description, the embodiment of FIG. 12 is illustrated with only two (2) secondary memories 310 and 310-1 and corresponding internal hardware filters 330 and 330-1. However, other filtering methods according to embodiments of the inventive concept may include any reasonable number of secondary memories and internal hardware filters. Further, two or more secondary memories may functionally share the same internal hardware filter.

Except for the addition of the second secondary memory 310-1 and second internal hardware filter 330-1, the structure and operation of the data storage device 300C shown in FIG. 12 are substantially the same as the structure and operation of the data storage device 300A of FIG. 1. That is, the structure and operation of the internal hardware filter 330 described in relation to the embodiments of FIGS. 1 and 9 are substantially the same as the structure and operation of the second internal hardware filter 330-1 incorporated in the embodiment of FIG. 12.

The host 200 outputs a filtering command FCMD and a read command RCMD to the data storage device 300C. Filtering condition data FCD generated based on the filtering command FCMD may be set or programmed in each internal hardware filter 330 and 330-1 by the firmware or the API performed by the CPU 303 of FIG. 14.

So, as previously described with reference to FIGS. 1, 5, and 7, the first secondary memory 310 may be used to communicate the first read data RDATA1 to the first internal hardware filter 330 in response to a first read command RCMD1.

The first internal hardware filter 330 may then filter the first read data RDATA according to the filtering condition data FCD and output the first filtered data FDATA1 to the bus 301. The first memory controller 350 stores each row REC1' and REC3' corresponding to each row REC1 and REC3 in the primary memory 370.

Additionally, the second secondary memory 310-1 communicates the second read data RDATA2 to the second internal hardware filter 330-1 in response to a second read command RCMD2. The second internal hardware filter 330-1 may filter second read data RDATA2 according to the filtering condition data FCD, and output second filtered data FDATA2 to the bus 301.

The first memory controller 350 stores each row REC5' and REC7' corresponding to each row REC5 and REC7 in the primary memory 370. The first memory controller 350 reads each row REC1', REC3', REC5', and REC7' included in each table TAB2 and TAB12 stored in the primary memory 370, and transmits data including each row REC1', REC3', REC5', and REC7', e.g., a table TAB13, to the bus 301.

The host controller 390 may transmit the first filtered data FDATA1 and the second filtered data FDATA2 to the host 200 as one table TAB13.

FIG. 14 is a block diagram illustrating a data processing system according to still another embodiment of the inventive concept. Referring to FIG. 14, a data processing system 100D again includes the host 200 and a data storage device 300D, where except for the modification of the CPU 303 and the addition of a second memory controller 305, the structure and operation of the data storage device 300D shown in FIG. 14 are substantially the same as the structure and operation of the data storage device 300C described in relation to FIG. 12.

The host 200 outputs a filtering command FCMD and a read command RCMD to the data storage device 300D. As described above, the filtering command FCMD may include the read command RCMD.

The CPU 303 may control an operation of the second memory controller 305, the first internal hardware filter 330, the second internal hardware filter 330-1, the first memory controller 350, and the host controller 390. The CPU 303 may receive the filtering command FCMD through the host controller 390 and the bus 301, interpret the filtering command FCMD, generate filtering condition data FCD based on a result of the interpretation, and program the filtering condition data FCD in each of the internal hardware filters 330 and 330-1.

The CPU 303 interprets the read command RCMD and outputs a command corresponding to a result of the interpretation to the second memory controller 305.

The second memory controller 305 generates a first read command RCMD1 and a second read command RCMD2, transmits the first read command RCMD1 to the first secondary memory 310, and transmits a second read command RCMD2 to the second secondary memory 310-1 in response to the command RCMD output from the CPU 303. Accordingly, the first secondary memory 310 transmits first read data RDATA1 to the first internal hardware filter 330 in response to the first read command RCMD1, and the second secondary memory 310-1 transmits second read data RDATA2 to the second internal hardware filter 330-1 in response to the second read command RCMD2.

The CPU 303 in the illustrated embodiment of FIG. 14 specifically includes an internal memory (MEM) 304. The internal memory 304 may be embodied as a SRAM, and may be used to filter necessary data from the first filtered data FDATA1 and second filtered data FDATA2 using the internal memory 304. This additional filtering steps will be referred to as "secondary filtering" by the CPU 303.

The host controller 390 may be used to communicate data undergoing secondary filtering by the CPU 303 to the host 200.

Figure 15:
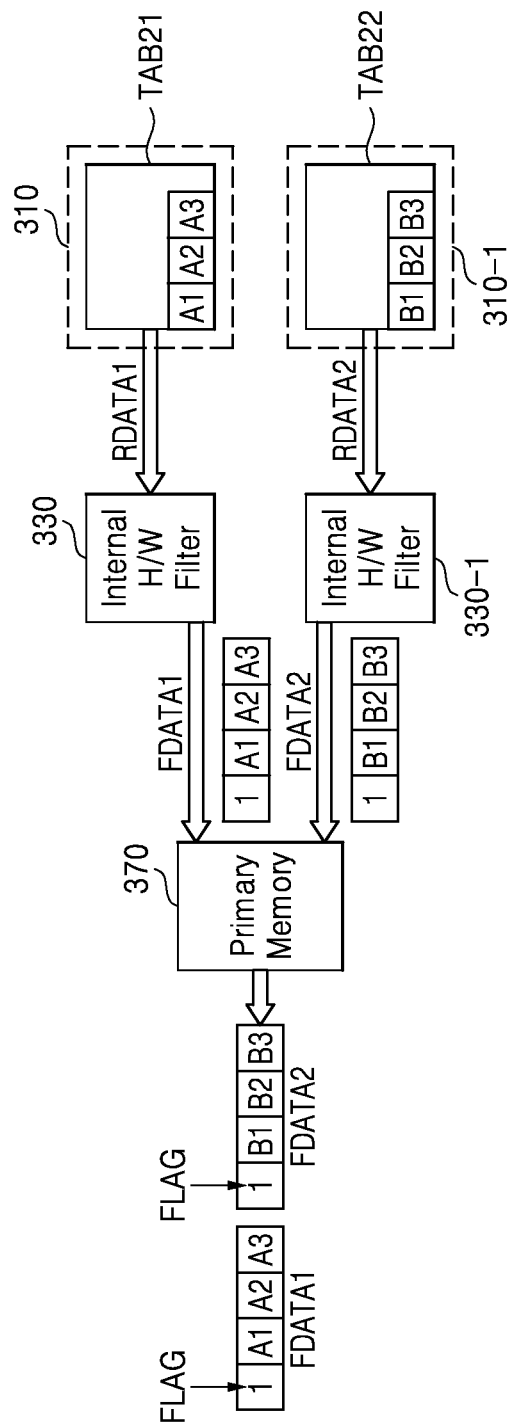

FIG. 15 is a conceptual diagram illustrating a flow of data through the data processing system of FIG. 14. Assuming that data is stored in both the first and second secondary memories 310 and 310-1, each being respectively used as a database, the stored data—which may have a variable length—is further assumed to be stored in a row-wise arrangement. Here, it is also assumed that a first portion of a desired row of data is stored in the first secondary memory 310 and a second portion of the desired row is stored in the second secondary memory 310-1.

As illustrated in FIG. 15, one row is stored across first and second secondary memories 310 and 310-1. That is, first data A1A2A3 corresponding to a first portion of the row is stored in a first table TAB21 of the first secondary memory 310, while second data B1B2B3 corresponding to a second portion of the row is stored in a second table TAB22 of the second secondary memory 310-1.

The first internal hardware filter 330 may be used to filter the first read data RDATA1 according to the filtering condition data FCD in order to output first filtered data FDATA1. Here, the first internal hardware filter 330 may be used to generate a flag FLAG=1 indicating output data is the first filtered data FDATA1, and output both the flag FLAG=1 and the first filtered data FDATA1 to the first memory controller 350 via the bus 301.

The second internal hardware filter 330-1 may be used to filter the second read data RDATA2 according to the filtering condition data FCD in order to output second filtered data FDATA2. Here, the second internal hardware filter 330-1 may be used to generate a flag FLAG=1 indicating output data is the second filtered data FDATA2, and output both the flag FLAG=1 and the second filtered data FDATA2 to the first memory controller 350 via the bus 301. Accordingly, the host 200 may differentiate between the first filtered data FDATA1 and the second filtered data FDATA2 on the basis of corresponding flag values.

Figure 16:
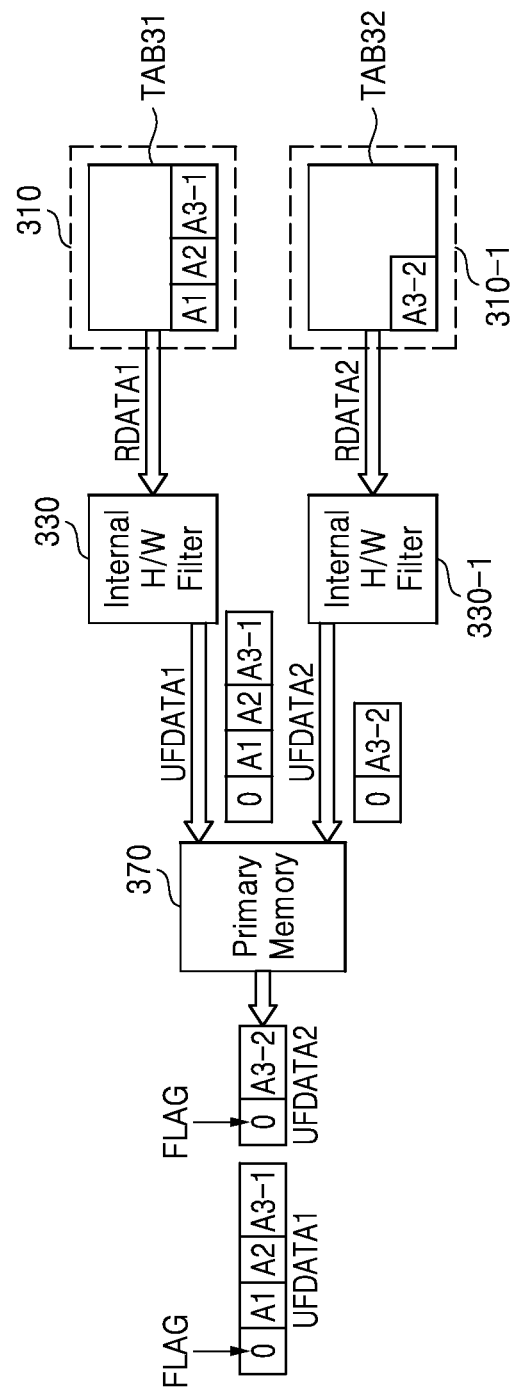

FIG. 16 is a conceptual diagram illustrating another flow of data through the data processing system of FIG. 14 under the same assumptions made with respect to FIG. 15. Here, first data A1A2A3-1 corresponding to a first portion of a row is stored in a first table TAB31 of the first secondary memory 310, and second data A3-2 corresponding to a second portion of the row is stored in a second table TAB32 of the second secondary memory 310-1.

The first internal hardware filter 330 does not filter the first data, but instead outputs the first read data RDATA1 'as is' or as it was stored in the first secondary memory 310.

Here, the first internal hardware filter 330 may be used to generate a flag FLAG=0 indicating that the output of the first data (UFDATA1) was filtered. Hence, both the flag value and the 'as-is' first data UFDATA1 are communicated to the first memory controller 350 via the bus 301.

In addition, the second internal hardware filter 330-1 may also be used to output 'as-is' second read data RDATA2 without filtering. Here, the second internal hardware filter 330-1 also generates a flag FLAG=0 indicating the output of 'as-is' data (UFDATA2). Both the flag FLAG=0 and the second output data UFDATA2 is provided to the first memory controller 350 via the bus 301.

Figure 17:
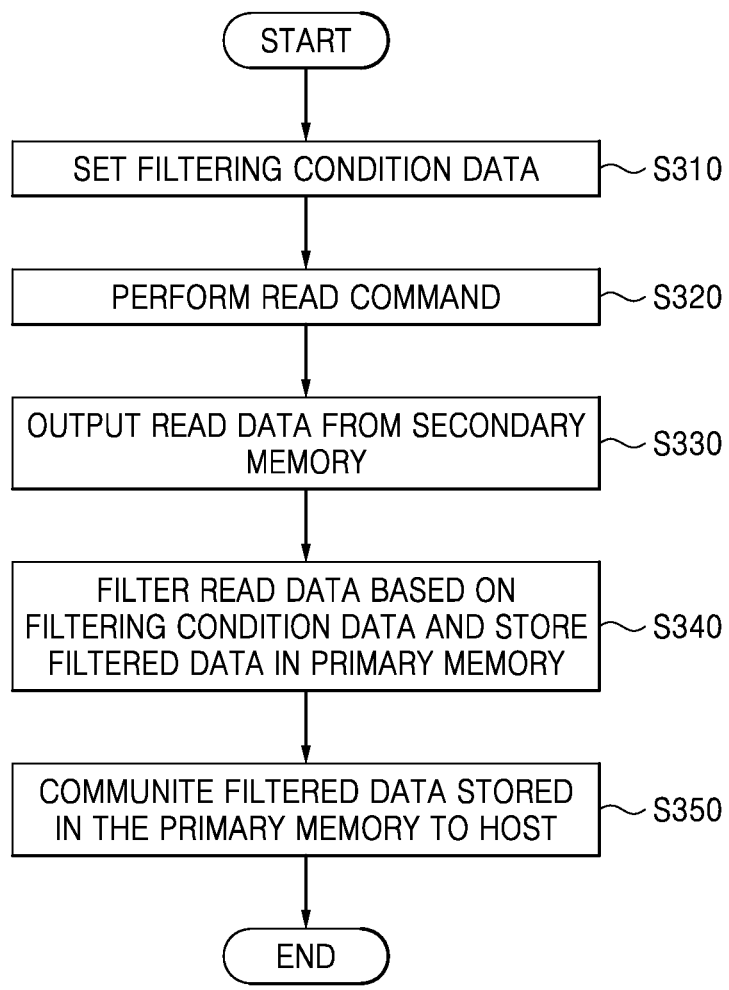
FIG. 17 is a flowchart summarizing a method of operating a data processing system according to embodiments of the inventive concept.

FIG. 17 is a flowchart summarizing a method of operating a data processing system according to an embodiment of the inventive concept. The illustrated method of operating may be applied to any one of the data storage device 300A, 300B, 300C, or 300D previously described in relation to FIGS. 1, 5, 12 and 17.

With respect to FIG. 17, filtering condition data FCD is "set" or programmed in at least one of the hardware filters 330 and 330-1 (S310). The filtering condition data FCD may be data related to a filtering command FCMD. The filtering condition data FCD may be programmed in at least one of the hardware filters 330 and 330-1 by the CPU 303 or according to the firmware or the API performed by the CPU 303.

At least one of the secondary memories 310 and 310-1 now performs a corresponding read command RCMD1 and/or RCMD2 (S320), and communicates resulting read data RDATA1 and/or RDATA2 to a corresponding internal hardware filter 330 and/or 330-1 (S330).

At least one of the hardware filters 330 and 330-1 filters corresponding data RDATA1 and/or RDATA2 using the filtering condition data FCD, and stores corresponding filtered data FDATA1 and/or FDATA2 in the primary memory 370 via the bus 301 and the first memory controller 350 (S340).

The first memory controller 350 transmits the corresponding filtered data FDATA1 and/or FDATA2 stored in the primary memory 370 to the host 200 through the bus 301 and the host controller 390 (S350).

Figure 18:
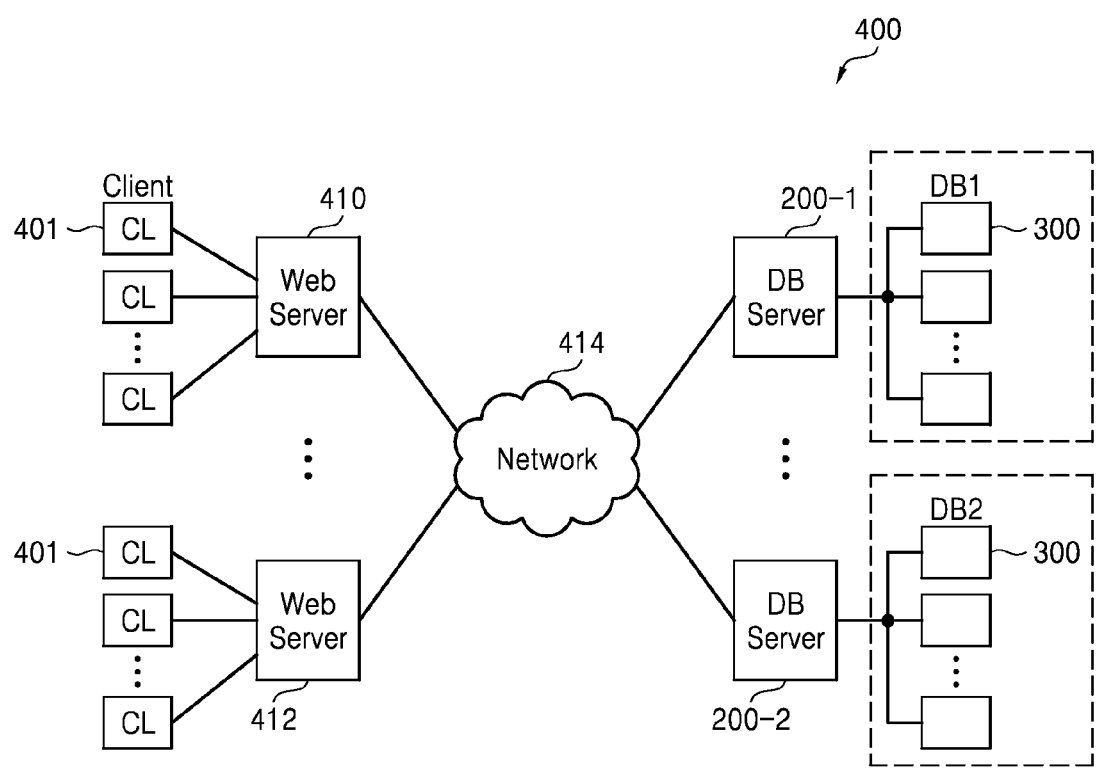
FIG. 18 is a block diagram illustrating a data server system that may incorporate one or more embodiments of the inventive concept.

FIG. 18 is a block diagram of a data server system according to an embodiment of the inventive concept. Referring to FIG. 18, a data server system 400 includes a plurality of clients 401, a plurality of web servers 410 to 412, a plurality of database servers 200-1 to 200-2, and a plurality of databases DB1 to DB2. The data server system 400 may mean a search portal or an Internet data center (IDC).

The plurality of clients 401 may communicate with each of the web servers 410 to 412 through a network. Each of the plurality of clients 401 may be embodied in a personal computer (PC), a laptop computer, a smart phone, a tablet PC, a personal digital assistant (PDA), or a mobile internet device (MID).

Each of the plurality of web servers 410 to 412 may communicate with each of the plurality of database servers 200-1 to 200-2 through a network 414. Each of the plurality of database servers 200-1 to 200-2 may perform a function of the host 200.

Each of the plurality of database servers 200-1 to 200-2 may control an operation of each of the plurality of databases DB1 to DB2. Each of the plurality of database servers 200-1 to 200-2 may access each of the plurality of databases DB1 to DB2. Each of the databases DB1 to DB2 includes a plurality of data storage devices 300.

The plurality of web servers 410 to 412 and the plurality of database servers 100-1 to 100-2 may communicate with each other through a network. The network includes a wire network, a wireless network, the internet, or a mobile telephone network.

An all-in-one data storage device embedded with a secondary memory, an internal hardware filter, and a primary memory may minimize the flow of data between one or more secondary memories and a primary memory.

The internal hardware filter embedded in the all-in-one data storage device may be used to filter big data "proximate" to the secondary memory, thereby reducing the volume of big data necessarily exchanged between memories during a process of selecting desired data from the big data.

Although a certain embodiments of the inventive concept have been illustrated and described herein, it will be appreciated by those skilled in the art that changes may be made to the illustrated and described embodiments without departing from the scope of the inventive concept as defined by the following claims and their equivalents.

What is claimed is:

1. A data storage device configured for use in a memory system including a host, the data storage device comprising:
   a host controller that receives from the host a filtering command and a read command directed to desired data among big data stored in a secondary memory, wherein the secondary memory serves as a database storing the big data;
   an internal hardware filter, separate from the host controller, disposed in the data storage device functionally adjacent to the secondary memory, and configured to receive read data from the secondary memory in response to a first read command derived from the read command, and to filter the received read data according to filtering condition data derived from the filtering command to generate first filtered data; and
   a memory controller, separate from the host controller, and configured to store the first filtered data generated by the internal hardware filter in a primary memory separate in the data storage device from the secondary memory, and thereafter to communicate the first filtered data stored in the primary memory to the host in response to the read command,
   wherein the internal hardware filter comprises:
      a data buffer that receives and buffers the read data;
      a data extractor that extracts first extraction data and second extraction data from the read data using extraction condition data included in the filtering condition data; and
      a data comparator that compares matching key data included in the filtering condition data with the first extraction data, and determines to output the second extraction data as the first filtered data upon a positive comparison result between the matching key data and the first extraction data,
   wherein the data extractor comprises:
      a parsing data generation circuit that generates parsing data for parsing columns included in a row of the read data based on the extraction condition data and metadata of the read data; and
      an extraction circuit that extracts the first extraction data and the second extraction data from the row of the read data based on the parsing data, and
   wherein the data comparator comprises:
      a register that stores the matching key data;
      a comparator that compares the matching key data stored in the register with the first extraction data to generate a positive matching comparison signal or a negative non-matching comparison signal; and
      an output control circuit that determines to output the second extraction data in response to the positive matching comparison signal.

2. The data storage device of claim 1, wherein the host controller generates the filtering condition data in response to the filtering command.

3. The data storage device of claim 1, wherein the filtering condition data is expressed in a data file having a data structure defined by a Structured Query Language (SQL).

4. The data storage device of claim 1, wherein the host controller generates the first read command from the read command.

5. The data storage device of claim 1, wherein the secondary memory stores the read data using a database layout including a header, a number of rows arranged in a row direction, and a number of row offsets, each one respectively associated with one of the number of rows.

6. The data storage device of claim 1, wherein the filtering command includes a query, and the data storage device further comprises:
   a central processing unit (CPU) configured to generate the filtering condition data in response to the query, and thereafter to program the filtering condition data to the internal hardware filter.

7. The data storage device of claim 6, wherein the query is expressed by one of a Structured Query Language (SQL) and a unique query language.

8. The data storage device of claim 6, wherein the filtering command and the read command are combined in a single command provided by the host.

9. A data storage device configured for use in a memory system including a host, the data storage device comprising:
   a host controller that receives from the host a filtering command and a read command directed to desired data among big data stored in a first secondary memory and a second secondary memory, wherein the first secondary memory and the second secondary memory collectively serve as a database storing the big data;
   a first internal hardware filter, separate from the host controller, disposed in the data storage device functionally adjacent to the first secondary memory, and configured to receive a first portion of read data from the first secondary memory as a received first portion of read data in response to a first read command derived from the read command, and to filter the received first portion of read data according to filtering condition data derived from the filtering command to generate a first portion of filtered data;
   a second internal hardware filter, separate from the host controller and the first internal hardware filter, disposed in the data storage device functionally adjacent to the second secondary memory, and configured to receive a second portion of read data from the second secondary memory as a received second portion of read data in response to a first read command, and to filter the received second portion of read data according to the filtering condition data to generate a second portion of filtered data; and
   a memory controller, separate from the host controller, configured to store the first portion of filtered data and second portion of filtered data in a primary memory separate in the data storage device from the first secondary memory and the second secondary memory, and thereafter to communicate the first portion of filtered data and second portion of filtered data stored in the primary memory to the host in response to the read command, wherein each of the first internal hardware filter and the second internal hardware filter comprises:

a data buffer that receives and buffers the read data;

a data extractor that extracts first extraction data and second extraction data from the read data using extraction condition data included in the filtering condition data; and a data comparator that compares matching key data included in the filtering condition data with the first extraction data, and determines to output the second extraction data as the first portion of filtered data upon a positive comparison result between the matching key data and the first extraction data, wherein the data extractor comprises:

a parsing data generation circuit that generates parsing data for parsing columns included in a row of the read data based on the extraction condition data and metadata of the read data; and an extraction circuit that extracts the first extraction data and the second extraction data from the row of the read data based on the parsing data, and wherein the data comparator comprises:

a register that stores the matching key data;

a comparator that compares the matching key data stored in the register with the first extraction data to generate a positive matching comparison signal or a negative non-matching comparison signal; and an output control circuit that determines to output the second extraction data in response to the positive matching comparison signal.

10. The data storage device of claim 9, further comprising:

a first central processing unit (CPU) that generates a control sequence based on the filtering command; and a second CPU that generates the filtering condition data based on the control sequence, wherein the control sequence includes first information identifying a table to be read from the first secondary memory, second information identifying columns to be extracted from columns included in the table, and third information identifying a column value to be extracted from the table.

11. The data storage device of claim 9, wherein the data storage device includes a solid state drive (SSD), the first secondary memory is a flash memory, and the primary memory is a dynamic random access memory (DRAM).

12. The data storage device of claim 9, wherein the first internal hardware filter generates a flag associated with the first portion of filtered data, the flag indicating whether or not the first portion of filtered data has been filtered according to the filtering condition data.

13. A method of operating a data storage device adapted for use in a memory system including a host, the data storage device being embedded with a secondary memory, a primary memory, an internal hardware filter disposed functionally adjacent to the secondary memory, and a memory controller separate from the internal hardware filter, the method comprising:

receiving read data in the internal hardware filter from the functionally adjacent secondary memory;

filtering the read data using filtering condition data stored in the internal hardware filter to generate filtered data;

storing the filtered data in the primary memory; and communicating, by the memory controller, the filtered data stored in the primary memory to the host, wherein the internal hardware filter comprises:

a data buffer that receives and buffers the read data;

a data extractor that extracts first extraction data and second extraction data from the read data using extraction condition data included in the filtering condition data; and a data comparator that compares matching key data included in the filtering condition data with the first extraction data, and determines to output the second extraction data as the filtered data upon a positive comparison result between the matching key data and the first extraction data, wherein the data extractor comprises:

a parsing data generation circuit that generates parsing data for parsing columns included in a row of the read data based on the extraction condition data and metadata of the read data; and an extraction circuit that extracts the first extraction data and the second extraction data from the row of the read data based on the parsing data, and wherein the data comparator comprises:

a register that stores the matching key data;

a comparator that compares the matching key data stored in the register with the first extraction data to generate a positive matching comparison signal or a negative non-matching comparison signal; and an output control circuit that determines to output the second extraction data in response to the positive matching comparison signal.

14. The method of claim 13, further comprising:

receiving a query in the data storage device from the host; and programming the filtering condition data in the internal hardware filter in response to the query.

15. The method of claim 13, further comprising:

receiving indication data and a query from the host; and programming the filtering condition data in the internal hardware filter in response to the indication data and the query, wherein, when the read data is stored in the secondary memory using a database format identified by the indication data.

16. The method of claim 15, wherein the database format includes; a header, a number of rows arranged in a defined row direction, and a number of row offsets, each row offset being respectively associated with one of the number of rows.

17. The method of claim 15, wherein the query is expressed by one of a Structured Query Language (SQL) and a unique query language.

* * * * *